US012585928B2

(12) United States Patent
Hunter et al.

(10) Patent No.: US 12,585,928 B2
(45) Date of Patent: Mar. 24, 2026

(54) HARDWARE ARCHITECTURE FOR INTRODUCING ACTIVATION SPARSITY IN NEURAL NETWORK

(71) Applicant: Numenta, Inc., Redwood City, CA (US)

(72) Inventors: Kevin Lee Hunter, Sunnyvale, CA (US); Subutai Ahmad, Palo Alto, CA (US)

(73) Assignee: Numenta, Inc., Menlo Park, CA (US)

( * ) Notice: Subject to any disclaimer, the term of this patent is extended or adjusted under 35 U.S.C. 154(b) by 1107 days.

(21) Appl. No.: 17/332,295

(22) Filed: May 27, 2021

(65) Prior Publication Data

US 2022/0108157 A1 Apr. 7, 2022

Related U.S. Application Data

(60) Provisional application No. 63/087,644, filed on Oct. 5, 2020.

(51) Int. Cl.
*G06N 3/063* (2023.01)
*G06F 7/08* (2006.01)

(52) U.S. Cl.
CPC .............. *G06N 3/063* (2013.01); *G06F 7/08* (2013.01)

(58) Field of Classification Search
CPC ........ G06N 3/063; G06N 3/045; G06N 3/048; G06N 3/084; G06F 7/08
See application file for complete search history.

(56) References Cited

U.S. PATENT DOCUMENTS 4,766,534 A 8/1988 DeBenedictis
4,845,744 A 7/1989 DeBenedictis
(Continued)

FOREIGN PATENT DOCUMENTS

CN 109472226 A * 3/2019 ............. G06N 3/045
CN 111626967 A * 9/2020
(Continued)

OTHER PUBLICATIONS

Brownlee, Jason, "How Do Convolutional Layers Work in Deep Learning Neural Networks?" Apr. 17, 2020, Machine Learning Mastery, p. 1-21, http://machinelearningmastery.com/convolutional-layers-for-deep-learning-neural-networks/ (Year: 2020).*
(Continued)

*Primary Examiner* — Alexey Shmatov
*Assistant Examiner* — Kyu Hyung Han
(74) *Attorney, Agent, or Firm* — WTA IP Law P.C.

(57) ABSTRACT

A hardware accelerator that is efficient at performing computations related to a sparse neural network. The sparse neural network may be associated with a plurality of nodes. An artificial intelligence (AI) accelerator stores, at a memory circuit, a weight tenor and an input activation tensor that corresponds to a node of the neural network. The AI accelerator performs a computation such as convolution between the weight tenor and the input activation tensor to generate an output activation tensor. The AI accelerator introduces sparsity to the output activation tensor by reducing the number of active values in the output activation tensor. The sparsity activation may be a K-winner approach, which selects the K-largest values in the output activation tensor and set the remaining values to zero.

20 Claims, 16 Drawing Sheets

(56) References Cited

U.S. PATENT DOCUMENTS

| | | |
|---|---|---|
| 5,113,507 A | 5/1992 | Jaeckel |
| 5,255,348 A | 10/1993 | Nenov |
| 5,712,953 A | 1/1998 | Langs |
| 5,729,661 A | 3/1998 | Keeler et al. |
| 5,761,389 A | 6/1998 | Maeda et al. |
| 6,028,608 A | 2/2000 | Jenkins |
| 6,122,014 A | 9/2000 | Panusopone et al. |
| 6,144,711 A | 11/2000 | Raleigh et al. |
| 6,195,622 B1 | 2/2001 | Altschuler et al. |
| 6,400,996 B1 | 6/2002 | Hoffberg et al. |
| 6,468,069 B2 | 10/2002 | Lemelson et al. |
| 6,567,814 B1 | 5/2003 | Banker et al. |
| 6,615,211 B2 | 9/2003 | Beygelzimer et al. |
| 6,625,585 B1 | 9/2003 | MacCuish et al. |
| 6,714,941 B1 | 3/2004 | Lerman et al. |
| 6,751,343 B1 | 6/2004 | Ferrell et al. |
| 6,957,241 B2 | 10/2005 | George |
| 7,088,693 B2 | 8/2006 | George |
| 7,251,637 B1 | 7/2007 | Caid et al. |
| 7,308,134 B2 | 12/2007 | Wersing et al. |
| 7,430,546 B1 | 9/2008 | Suri |
| 7,613,675 B2 | 11/2009 | Hawkins et al. |
| 7,620,608 B2 | 11/2009 | Jaros et al. |
| 7,624,085 B2 | 11/2009 | Hawkins et al. |
| 7,676,458 B2 | 3/2010 | Aggarwal et al. |
| 7,739,208 B2 | 6/2010 | George et al. |
| 7,778,946 B2 | 8/2010 | Hercus |
| 7,826,990 B2 | 11/2010 | Nasle et al. |
| 7,840,395 B2 | 11/2010 | Nasle et al. |
| 7,840,396 B2 | 11/2010 | Radibratovic et al. |
| 7,844,439 B2 | 11/2010 | Nasle et al. |
| 7,844,440 B2 | 11/2010 | Nasle et al. |
| 7,899,775 B2 | 3/2011 | George et al. |
| 7,904,412 B2 | 3/2011 | Saphir et al. |
| 7,937,342 B2 | 5/2011 | George et al. |
| 7,941,389 B2 | 5/2011 | Marianetti et al. |
| 7,941,392 B2 | 5/2011 | Saphir |
| 7,958,280 B2 | 6/2011 | Salessi et al. |
| 7,983,998 B2 | 7/2011 | George et al. |
| 8,037,010 B2 | 10/2011 | Jaros et al. |
| 8,081,209 B2 | 12/2011 | Ji et al. |
| 8,102,423 B2 | 1/2012 | Cheng |
| 8,103,603 B2 | 1/2012 | George et al. |
| 8,112,367 B2 | 2/2012 | George et al. |
| 8,121,961 B2 | 2/2012 | George et al. |
| 8,175,981 B2 | 5/2012 | Hawkins et al. |
| 8,175,984 B2 | 5/2012 | George |
| 8,175,985 B2 | 5/2012 | Sayfan et al. |
| 8,195,582 B2 | 6/2012 | Niemasik et al. |
| 8,219,507 B2 | 7/2012 | Jaros et al. |
| 8,285,667 B2 | 10/2012 | Jaros et al. |
| 8,290,886 B2 | 10/2012 | George et al. |
| 8,645,291 B2 | 2/2014 | Hawkins et al. |
| 11,144,823 B1 | 10/2021 | Xiao |
| 11,392,829 B1 | 7/2022 | Pool |
| 11,803,736 B1 | 10/2023 | Meyer |
| 12,086,566 B2 | 9/2024 | Rose |
| 2002/0002688 A1 | 1/2002 | Gregg et al. |
| 2002/0150044 A1 | 10/2002 | Wu et al. |
| 2002/0161736 A1 | 10/2002 | Beygelzimer et al. |
| 2003/0069002 A1 | 4/2003 | Hunter et al. |
| 2003/0123732 A1 | 7/2003 | Miyazaki et al. |
| 2003/0167111 A1 | 9/2003 | Kipersztok et al. |
| 2004/0002838 A1 | 1/2004 | Oliver et al. |
| 2004/0142325 A1 | 7/2004 | Mintz et al. |
| 2004/0148520 A1 | 7/2004 | Talpade et al. |
| 2004/0267395 A1 | 12/2004 | Discenzo et al. |
| 2005/0002572 A1 | 1/2005 | Saptharishi et al. |
| 2005/0028033 A1 | 2/2005 | Kipersztok et al. |
| 2005/0063565 A1 | 3/2005 | Nagaoka et al. |
| 2005/0190990 A1 | 9/2005 | Burt et al. |
| 2005/0222811 A1 | 10/2005 | Jakobson et al. |
| 2006/0093188 A1 | 5/2006 | Blake et al. |
| 2006/0161736 A1 | 7/2006 | Huang |
| 2006/0184462 A1 | 8/2006 | Hawkins |
| 2006/0212444 A1 | 9/2006 | Handman et al. |
| 2006/0235320 A1 | 10/2006 | Tan et al. |
| 2006/0248026 A1 | 11/2006 | Aoyama et al. |
| 2006/0248073 A1 | 11/2006 | Jones et al. |
| 2006/0253491 A1 | 11/2006 | Gokturk et al. |
| 2006/0259163 A1 | 11/2006 | Hsiung et al. |
| 2007/0005531 A1 | 1/2007 | George et al. |
| 2007/0019754 A1 | 1/2007 | Raleigh et al. |
| 2007/0192264 A1 | 8/2007 | Hawkins et al. |
| 2007/0192267 A1 | 8/2007 | Hawkins et al. |
| 2007/0192268 A1 | 8/2007 | Hawkins et al. |
| 2007/0192269 A1 | 8/2007 | Saphir et al. |
| 2007/0192270 A1 | 8/2007 | Hawkins et al. |
| 2007/0228703 A1 | 10/2007 | Breed |
| 2007/0276744 A1 | 11/2007 | Burke |
| 2007/0276774 A1 | 11/2007 | Ahmad et al. |
| 2008/0059389 A1 | 3/2008 | Jaros et al. |
| 2008/0140593 A1 | 6/2008 | George et al. |
| 2008/0183647 A1 | 7/2008 | Hawkins et al. |
| 2008/0201286 A1 | 8/2008 | Hawkins et al. |
| 2008/0208783 A1 | 8/2008 | Jaros et al. |
| 2008/0208915 A1 | 8/2008 | George et al. |
| 2008/0208966 A1 | 8/2008 | Edwards et al. |
| 2009/0006289 A1 | 1/2009 | Jaros et al. |
| 2009/0116413 A1 | 5/2009 | George |
| 2009/0150311 A1 | 6/2009 | George |
| 2009/0240886 A1 | 9/2009 | Sayfan et al. |
| 2009/0313193 A1 | 12/2009 | Hawkins et al. |
| 2010/0049677 A1 | 2/2010 | Jaros et al. |
| 2010/0185567 A1 | 7/2010 | Niemasik et al. |
| 2010/0191684 A1 | 7/2010 | George |
| 2010/0207754 A1 | 8/2010 | Shostak et al. |
| 2010/0312730 A1 | 12/2010 | Weng et al. |
| 2011/0047110 A1 | 2/2011 | Rinkus |
| 2011/0225108 A1 | 9/2011 | Hawkins et al. |
| 2011/0231351 A1 | 9/2011 | George et al. |
| 2012/0005134 A1 | 1/2012 | Jaros et al. |
| 2012/0166364 A1 | 6/2012 | Ahmad et al. |
| 2012/0197823 A1 | 8/2012 | Hawkins et al. |
| 2012/0330885 A1 | 12/2012 | Jaros et al. |
| 2013/0054495 A1 | 2/2013 | Hawkins et al. |
| 2013/0054496 A1 | 2/2013 | Marianetti et al. |
| 2013/0054552 A1 | 2/2013 | Hawkins et al. |
| 2014/0067734 A1 | 3/2014 | Hawkins et al. |
| 2014/0114896 A1 | 4/2014 | Hawkins et al. |
| 2014/0122394 A1 | 5/2014 | Hawkins et al. |
| 2014/0129499 A1 | 5/2014 | Hawkins |
| 2014/0207842 A1 | 7/2014 | Edwards et al. |
| 2014/0310226 A1 | 10/2014 | Marianetti et al. |
| 2014/0310227 A1 | 10/2014 | Marianetti et al. |
| 2015/0127595 A1 | 5/2015 | Hawkins et al. |
| 2015/0142710 A1 | 5/2015 | Hawkins et al. |
| 2015/0269484 A1 | 9/2015 | Hawkins et al. |
| 2016/0086098 A1 | 3/2016 | Hawkins et al. |
| 2016/0217164 A1 | 7/2016 | Hawkins et al. |
| 2016/0321557 A1 | 11/2016 | Hawkins et al. |
| 2017/0180515 A1 | 6/2017 | Edwards et al. |
| 2017/0255861 A1 | 9/2017 | Hawkins et al. |
| 2017/0286846 A1 | 10/2017 | Hawkins et al. |
| 2017/0330091 A1 | 11/2017 | Hawkins et al. |
| 2017/0351401 A1* | 12/2017 | Pascale ............... G06N 20/00 |
| 2018/0046916 A1 | 2/2018 | Dally |
| 2018/0276464 A1 | 9/2018 | Hawkins et al. |
| 2019/0087713 A1 | 3/2019 | Lamb |
| 2019/0147323 A1 | 5/2019 | Li |
| 2019/0171954 A1 | 6/2019 | Hawkins et al. |
| 2019/0188526 A1 | 6/2019 | Chen |
| 2019/0236481 A1 | 8/2019 | Hawkins et al. |
| 2019/0251465 A1 | 8/2019 | Hawkins et al. |
| 2020/0097857 A1 | 3/2020 | Hawkins et al. |
| 2020/0104682 A1 | 4/2020 | Hawkins et al. |
| 2020/0104692 A1* | 4/2020 | Hill ..................... G06F 5/06 |
| 2020/0125335 A1 | 4/2020 | Neoh |
| 2020/0193234 A1 | 6/2020 | Pai |
| 2020/0193274 A1 | 6/2020 | Rouhani et al. |
| 2020/0234114 A1 | 7/2020 | Rakshit |
| 2020/0285949 A1 | 9/2020 | Baum |
| 2021/0042624 A1 | 2/2021 | Matveev et al. |
| 2021/0133542 A1 | 5/2021 | Holm |

(56)                 References Cited

U.S. PATENT DOCUMENTS

| | | | |
|---|---|---|---|
| 2021/0150770 A1 | 5/2021 | Appu | |
| 2021/0158168 A1 | 5/2021 | Numenta | |
| 2021/0286860 A1 | 9/2021 | Chen | |
| 2021/0406686 A1 | 12/2021 | Xiao | |
| 2022/0076095 A1 | 3/2022 | Qin | |
| 2022/0261648 A1 | 8/2022 | Bhalgat | |
| 2022/0335272 A1 | 10/2022 | Elsen | |

FOREIGN PATENT DOCUMENTS

| | | | | |
|---|---|---|---|---|
| CN | 111639701 A * | 9/2020 | ........... | G06F 17/153 |
| EP | 1557990 A1 | 7/2005 | | |
| KR | 10-2021-0059647 A | 5/2021 | | |
| KR | 10-2021-0066863 A | 6/2021 | | |
| WO | WO 2009/006231 A1 | 6/2006 | | |
| WO | WO 2008/067326 A2 | 6/2008 | | |
| WO | WO 2006/063291 A2 | 1/2009 | | |
| WO | WO-2019001323 A1 * | 1/2019 | ............. | G06F 17/16 |

OTHER PUBLICATIONS

"Digital Comparator and Magnitude Comparator Tutorial" Basic Electronics Tutorials. Sep. 27, 2010. https://www.electronics-tutorials.ws/combination/comb_8.html (Year: 2010).*

Sharma, Vishal. "How to replace minimum values with 0 and maximum with 1 in an array" Matlab Help Center. Jun. 19, 2017. https://www.mathworks.com/matlabcentral/answers/345277-how-to-replace-minimum-values-with-0-and-maximum-with-1-in-an-array (Year: 2017).*

Hendry D.C., "Comparator trees for winner-take-all circuits", 2004, Neurocomputing, 62, p. 389-403 (Year: 2004).*

Final Office Action of the corresponding U.S. Appl. No. 17/332,181 mailed on Oct. 16, 2024.

International Preliminary Report on Patentability of PCT/IB2022/056158 issued on Dec. 14, 2023.

Ahmad et al. "How Can We Be So Dense? The Benefits of Using Highly Sparse Representations" (Year: 2019).

Adelson, E.H. et al., "The Perception of Shading and Reflectance," Perception as Bayesian Inference, 1996, pp. 409-423, Knill, D.C. et al., eds., Cambridge University Press, UK.

Agrawal, R. et al., "Mining Sequential Patterns, " IEEE, 1995, pp. 3-14.

Ahmad, S. et al., "PowerNuPIC," Numenta, Jun. 2008, Numenta HTM Workshop, Jun. 23-24, 2008, SRI Campus, Menlo Park, CA, fifty-six pages.

Ahmad, S., "NuPIC Jumpstart—Part II," Numenta, May 2008, Numenta HTM Workshop, Jun. 23-24, 2008, SRI Campus, Menlo Park, CA, thirty-three pages.

Archive of "Numenta Platform for Intelligent Computing Programmer's Guide," Numenta, Mar. 7, 2007, pp. 1-186, www.numenta.com, [Online] Archived by http://archive.org on Mar. 19, 2007; Retrieved on Aug. 13, 2008. Retrieved from the Internet<URL:http://web.archive.org/web/20070319232606/http://www.nume- nta.com/for-developers/softare/pdf/nupic_prog_guide.pdf>.

Åslin, F., "Evaluation of Hierarchical Temporal Memory in Algorithmic Trading," Thesis, Linkopings Universitet, Feb. 8, 2010, 37 pages.

Becerra, J.A. et al., "Multimodule Artificial Neural Network Architectures for Autonomous Robot Control Through Behavior Modulation," IWANN 2003, LNCS, pp. 169-176, vol. 2687.

Biancaniello, P. et al., Multimodal Pattern Recognition with Hierarchical Temporal Memory (MPR), Lockheed Martin Brain-Inspired Computing Research Overview, Numenta HTM Workshop, Jun. 2008, twelve pages.

Bobier, B., "Content-Based Image Retrieval Using Hierarchical Temporal Memory," Numenta HTM Workshop, Jun. 23-24, 2008, SRI Campus, Menlo Park, CA, seven pages.

Bradski, G. et al., "Fast-Learning VIEWNET Architectures for Recognizing Three-dimensional Objects from Multiple Two-dimensional Views," Neural Networks, 1995, pp. 1053-1080, vol. 8, No. 7/8.

Bryhni et al., "A Comparison of Load Balancing Ttechniques for Scalable Web Servers," IEEE Network, Jul./Aug. 2000, pp. 58-64.

Ceisel, A. et al., "Using HTM Networks to Decode Neural Signals from the Motor Cortex: A Novel Approach to Brain-Computer Interface Control," Illinois Institute of Technology, Numenta HTM Workshop, 2009, four pages.

Chapela, V., "Preventing Financial Fraud," Smart Security Services, Numenta HTM Workshop, 2009, forty pages.

Colombe, J., "A Survey of Recent Developments in Theoretical Neuroscience and Machine Vision," Proceedings of the IEEE Applied Imagery Pattern Recognition Workshop, 2003, nine pages.

Cormack, G.V. et al., "Data Compression Using Dynamic Markov Modelling," The Computer Journal, 1987, pp. 541-550, vol. 30, No. 6.

Csapo, A.B. et al., "Object Categorization Using VFA-Generated Nodemaps and Hierarchical Temporal Memories," IEEE International Conference on Computational Cybernetics, Oct. 7, 2007, pp. 257-262.

Curry, C. et al., "Speech Processing with HTM," Numenta HTM Workshop, Jun. 23-24, 2008, SRI Campus, Menlo Park, CA, fifty-seven pages.

Dean, T., "Learning Invariant Features Using Inertial Priors," Annals of Mathematics and Artificial Intelligence, 2006, pp. 223-250, vol. 47.

Demeris, Y. et al., "From Motor Babbling to Hierarchical Learning by Imitation: A Robot Developmental Pathway," Proceedings of the Fifth International Workshop on Epigenetic Robotics: Modeling Cognitive Development in Robotic Systems, 2005, pp. 31-37.

Dimitrova, N. et al., "Motion Recovery for Video Content Classification," ACM Transactions on Information Systems, Oct. 1995, pp. 408-439, vol. 13, No. 4.

Ding, C.H.Q., "Cluster Merging and Splitting in Hierarchical Clustering Algorithms," Proceedings of the 2002 IEEE International Conference on Data Mining (ICDM 2002), Dec. 9, 2002, pp. 139-146.

Dolin, R. et al., "Scalable Collection Summarization and Selection," Association for Computing Machinery, 1999, pp. 49-58.

Dubinsky, D., "Numenta Business Strategy," Numenta, Jun. 2008, Numenta HTM Workshop, Jun. 23-24, 2008, SRI Campus, Menlo Park, CA, fifteen pages.

Dudgeon, M. et al., "Evolved HTM Preprocessing," Qualia Labs, Jun. 25, 2009, nine pages.

Eastman, K. "HTM's & Airline Passenger Behavior: Prediction and Inference Model," Numenta HTM Workshop, 2009, ten pages.

Edsa, "Project Information," Apr. 2008, Numenta HTM Workshop, Jun. 23-24, 2008, SRI Campus, Menlo Park, CA, four pages.

Eswaran, K., "Numenta Lightning Talk on Dimension Reduction and Unsupervised Learning," Numenta HTM Workshop, Jun. 23-24, 2008, SRI Campus, Menlo Park, CA, thirty pages.

Fan, et al., "A Genetic Sparse Distributed Memory Approach to the Application of Handwritten Character Recognition," 1997, pp. 2015-2022.

Farahmand, N. et al., "Online Temporal Pattern Learning," Proceedings of the International Joint Conference on Neural Networks, Jun. 14-19, 2009, pp. 797-802, Atlanta, GA, USA.

Felleman, D.J. et al., "Distributed Hierarchical Processing in the Primate Cerebral Cortex," Cerebral Cortex, Jan./Feb. 1991, pp. 1-47, vol. 1.

Fine, S. et al., "The Hierarchical Hidden Markov Model: Analysis and Applications," Machine Learning, 1998, pp. 41-62, vol. 32, Kluwer Academic Publishers, Boston.

Finley, M., "Exploration of Motion Capture," Qualia Labs, Jun. 24, 2008, Numenta HTM Workshop, Jun. 23-24, 2008, SRI Campus, Menlo Park, CA, thirty-six pages.

Foldiak, P., "Learning Invariance from Transformation Sequences," Neural Computation, 1991, pp. 194-200, vol. 3, No. 2.

Fukushima, K., "Neocognitron: A Self-Organizing Neural Network Model for a Mechanism of Pattern Recognition Unaffected by Shift in Position," Biol. Cybernetics, 1980, pp. 193-202, vol. 36.

(56) References Cited

OTHER PUBLICATIONS

Garalevicius, S., "Memory-Prediction Framework for Pattern Recognition: Performance and Suitability of the Bayesian Model of Visual Cortex," American Association of Artificial Intelligence, 2007, six pages.

George, D. "Thesis: How the Brain Might Work," Dept. of Electrical Engineering and the Committee on Graduate Studies of Stanford University, Jun. 2008, one-hundred ninety-one pages.

George, D. et al., "A Hierarchical Bayesian Model of Invariant Pattern Recognition in the Visual Cortex," Proceedings, 2005 IEEE International Joint Conference on Neural Networks, Jul. 31-Aug. 4, 2005, pp. 1812-1817, vol. 3.

George, D. et al., "Invariant Pattern Recognition Using Bayesian Inference on Hierarchical Sequences," Technical Report, Sep. 17, 2004, pp. 1-8.

George, D. et al., "The HTM Learning Algorithms," Mar. 1, 2007, 44 pages. [Online] [Retrieved on Sep. 22, 2011] Retrieved from the Internet <URL:http://www.numenta.com/htm-overview/education/Numenta_HTM_Learning_Algos.pdf.>.

George, D. et al., "Towards a Mathematical Theory of Cortical Micro-circuits," PLoS Computational Biology, Oct. 2009, vol. 5, Issue 10, twenty-six pages.

Gottschalk, K. et al., "Introduction to Web Services Architecture," IBM Systems Journal, 2002, pp. 170-177, vol. 41, No. 2.

Gripon, V. et al., "Sparse Neural Networks with Large Learning Diversity," IEEE Transactions on Neural Networks, Jul. 2011, pp. 1087-1096, vol. 22, No. 7.

Guerrier, P., "A Generic Architecture for On-Chip Packet-Switched Interconnections," Association for Computing Machinery, 2000, pp. 250-256.

Guinea, D. et al., "Robot Learning to Walk: An Architectural Problem for Intelligent Controllers," Proceedings of the 1993 International Symposium on Intelligent Control, Aug. 1993, pp. 493-498, Chicago, USA.

Guo, C-E. et al., "Modeling Visual Patterns by Integrating Descriptive and Generative Methods," International Journal of Computer Vision, May 29, 2003, pp. 5-29, vol. 53, No. 1.

Haitani, R. et al., "Vitamin D Toolkit, Introduction," Jun. 24, 2008, Numenta HTM Workshop, Jun. 23-24, 2008, SRI Campus, Menlo Park, CA, eleven pages.

Haitani, R., "Smart Video: A Disruptive Market Opportunity for HTM," Numenta HTM Workshop, 2009, twelve pages.

Han, K. et al., "Automated Robot Behavior Recognition Applied to Robotic Soccer," In Proceedings of the IJCAI-99 Workshop on Team Behaviors and Plan Recognition, 1999, six pages.

Haritaoglu, I. et al., "W4: Real-Time Surveillance of People and Their Activities," IEEE Transactions on Pattern Analysis and Machine Intelligence, Aug. 2000, pp. 809-830, vol. 22, No. 8.

Hartung, J. et al., "Presentation: Support for the Use of Hierarchical Temporal Memory Systems in Automated Design Evaluation: A First Experiment," Numenta HTM Workshop, 2009, thrity-one pages.

Hartung, J. et al., "Support for the Use of Hierarchical Temporal Memory Systems in Automated Design Evaluation: A First Experiment," Proceedings of the ASME 2009 Int'l. Design Engineering Technical Conferences & Computers and Information in Engineering Conference, Aug. 30-Sep. 2, 2009, ten pages, San Diego, CA, USA.

Hasegawa, Y. et al., "Learning Method for Hierarchical Behavior Controller," Proceedings of the 1999 IEEE International Conference on Robotics & Automation, May 1999, pp. 2799-2804.

Hawkins, J. "Hierarchical Temporal Memory: History-Progress-Today-Tomorrow," HTM Workshop, Jun. 2009, twenty-four pages.

Hawkins, J. "Prediction Toolkit Overview," Numenta HTM Workshop, 2009, four pages.

Hawkins, J. et al., "Hierarchical Temporal Memory: Concepts, Theory and Terminology," Numenta, May 10, 2006, [Online] [Retrieved on Oct. 7, 2008] Retrieved from the Internet<URL:http://www.numenta.com/Numenta_HTM_Concepts.pdf>.

Hawkins, J. et al., "Hierarchical Temporal Memory: Concepts, Theory and Terminology," Numenta, Inc., Mar. 27, 2007, 20 pages. [Online] [Retrieved on Sep. 22, 2011] Retrieved from the Internet<URL:http://www.numenta.com/htm-overview/education/Numenta_HTM_Concepts.pdf.>.

Hawkins, J. et al., "On Intelligence," Sep. 2004, Times Books, Henry Holt and Company, New York, NY 10011.

Hawkins, J. et al., "Sequence Memory for Prediction, Inference and Behaviour," Philosophical Transactions of the Royal Society B, Mar. 31, 2009, pp. 1203-1209, vol. 364. [Online] [Retrieved Sep. 22, 2011] Retrieved from the Internet <URL:http://rstb.royalsocietypublishing.org/content/364/1521/1203.full-.pdf.>.

Hawkins, J., "Why Can't a Computer Be More Like a Brain?" IEEE Spectrum, Apr. 1, 2007, pp. 21-26, vol. 44, No. 4.

Hernandez-Gardiol, N. et al., "Hierarchical Memory-Based Reinforcement Learning," Proceedings of Neural Information Processing Systems, 2001, seven pages.

Hinton, G.E. et al., "The "Wake-Sleep" Algorithm for Unsupervised Neural Networks," Science, May 26, 1995, pp. 1158-1161, vol. 268.

Hoey, "Hierarchical unsupervised learning of facial expression categories," IEEE, 2001, 0-7695-1293-3, pp. 99-106.

Hyvarinen, A. et al., "Bubbles: A Unifying Framework for Low-Level Statistical Properties of Natural Image Sequences," J. Opt. Soc. Am. A., 2003, pp. 1237-1252, vol. 20, No. 7.

Isard, M. et al., "Icondensation: Unifying Low-Level and High-Level Tracking in a Stochastic Framework," Lecture Notes in Computer Science 1406, 1998, pp. 893-908, Burkhardt, H et al., ed., Springer-Verlag, Berlin.

Kim, J. et al., "Hierarchical Distributed Genetic Algorithms: A Fuzzy Logic Controller Design Application," IEEE Expert, Jun. 1996, pp. 76-84.

Kuenzer, A. et al., "An Empirical Study of Dynamic Bayesian Networks for User Modeling," Proceedings of the UM 2001 Workshop on Machine Learning, ten pages.

Lee, T.S. et al., "Hierarchical Bayesian Inference in the Visual Cortex," J. Opt. Soc. Am. A. Opt. Image. Sci. Vis., Jul. 2003, pp. 1434-1448, vol. 20, No. 7.

Lenser, S. et al., "A Modular Hierarchical Behavior-Based Architecture," RoboCup 2001, LNAI 2377, 2002, pp. 423-428, Birk, A et al., (eds.), Springer-Verlag, Berlin, Heidelberg.

Levinson, S. et al., "Automatic Language Acquisition for a Mobile Robot," Feb. 2005, Numenta HTM Workshop, Jun. 23-24, 2008, SRI Campus, Menlo Park, CA, twenty-seven pages.

Lewicki, M.S. et al., "Bayesian Unsupervised Learning of Higher Order Structure," Proceedings of the 1996 Conference in Advances in Neural Information Processing Systems 9, pp. 529-535.

Lim, "Estimation of Occlusion and Dense Motion Fields in a Bidirectional Bayesian Framework," IEEE Transactions on Pattern Analysis and Machine Intelligence, 2002, pp. 712-718, vol. 24, No. 5.

Lo, J. "Unsupervised Hebbian Learning by Recurrent Multilayer Neural Networks for Temporal Hierarchical Pattern Recognition," Information Sciences and Systems 44th Annual Conference on Digital Object Identifier, 2010, pp. 1-6.

Mahadevan, S. et al., "Validation of reliability computational models using Bayes networks," Reliability Engineering & System Safety, 2005, pp. 223-232, vol. 87.

Majure, L., "Unsupervised Phoneme Acquisition Using HTM," Jun. 25, 2009, eight pages.

Mannes, C., "A Neural Network Model of Spatio-Temporal Pattern Recognition, Recall and Timing," Technical Report CAS/CNS-92-013, Feb. 1992, Department of Cognitive and Neural Systems, Boston University, USA, seven pages.

Mari, J.-F. et al., "Temporal and Spatial Data Mining with Second-Order Hidden Markov Models," Soft Computing—A Fusion of Foundations, Methodologies and Applications, 2006, pp. 406-414, vol. 10, No. 5.

Mcdowell, C. et al., "SlugGo, a Computer Go Program," Numenta HTM Workshop, Jun. 23-24, 2008, SRI Campus, Menlo Park, CA, eighteen pages.

Miller, J. W. et al., "Biomimetic Sensory Abstraction Using Hierarchical Quilted Self-Organizing Maps," Society of Photo-Optical Instrumentation Engineers, 2006, eleven pages.

(56)          References Cited

OTHER PUBLICATIONS

Mishkin, M. et al., "Hierarchical Organization of Cognitive Memory," Phil. Trans. R. Soc. B., 1997, pp. 1461-1467, London.

Mitrovic, A., "An Intelligent SQL Tutor on the Web," International Journal of Artificial Intelligence in Education, 2003, pp. 171-195, vol. 13.

Muckli, L., "Predictive Coding in Apparent Motion," University of Glasgow, Numenta HTM Workshop, Jun. 25, 2009, twelve pages.

Murphy, K. et al., "Using the Forest to See the Trees: A Graphical Model Relating Features, Objects and Scenes," Advances in Neural Processing System, 2004, vol. 16, eight pages.

Murray, S.O. et al., "Shaper Perception Reduces Activity in Human Primary Visual Cortex," Proceedings of the Nat. Acad. of Sciences of the USA, Nov. 2002, pp. 15164-151169, vol. 99, No. 23.

Nair, D. et al., "Bayesian Recognition of Targets by Parts in Second Generation Forward Looking Infrared Images," Image and Vision Computing, 2000, pp. 849-864, vol. 18.

Namphol, A. et al., "Image Compression with a Hierarchical Neural Network," IEEE transactions on Aerospace and Electronic Systems, Jan. 1996, pp. 326-338, vol. 32, No. 1.

Naphade, M. et al., "A Probabilistic Framework for Semantic Video Indexing, Filtering, and Retrieval," IEEE Transactions on Multimedia, Mar. 2001, pp. 141-151, vol. 3, No. 1.

Naphade, M. et al., "Discovering Recurrent Events in Video Using Unsupervised Methods," IEEE ICIP, 2002, pp. 11-13 through 11-16.

Niemasik, J. "Vision Toolkit," Numenta HTM Workshop, 2009, twenty-eight pages.

Numenta, "HTM Algorithms," Numenta.RTM., Jun. 2008, Numenta HTM Workshop, Jun. 23-24, 2008, SRI Campus, Menlo Park, CA, 67 pages.

Numenta, "HTM Optimized Drug Therapy," SDSystem24.com, Numenta HTM Workshop, Jun. 23-24, 2008, SRI Campus, Menlo Park, CA, 7 pages.

Numenta, "HTM Workshop, Jumpstart," Numenta.RTM., Jun. 2008, Numenta HTM Workshop, Jun. 23-24, 2008, SRI Campus, Menlo Park, 86 pages.

Numenta, "Partial Transcript from Numenta HTM Workshop DVD Disc 1," Numenta, Jun. 2008, 6 pages.

Numenta, "Problem Solving with HTMs," Numenta.RTM., Jun. 2008, Numenta HTM Workshop, Jun. 23- 24, 2008, SRI Campus, Menlo Park, CA, 23 pages.

Numenta, "Vision Framework," Numenta.RTM., Jun. 2008, Numenta HTM Workshop, Jun. 23-24, 2008, SRI Campus, Menlo Park, CA 36 pages.

Numenta, Inc., "Business Strategy," Numenta HTM Workshop, 2009, fifteen pages.

Numenta, Inc., "Hierarchical Temporal Memory including HTM Cortical Learning Algorithms, Version 0.2.1," Sep. 12, 2011, sixty-eight pages. [Online] [Retrieved Sep. 22, 2011] Retrieved from the Internet <URL:http://www.numenta.com/htm-overview/education/HTM_CorticalL- earningAlgorithms.pdf.>.

Numenta, Inc., "Hierarchical Temporal Memory: Comparison with Existing Models, Version 1.01," Mar. 1, 2007, four pages.

Numenta, Inc., "Numenta Node Algorithms Guide NuPIC 1.6," Numenta, Jul. 22, 2008, pp. 1-7.

Numenta, Inc., "Numenta Node Algorithms Guide NuPIC 1.6," Numenta, Jun. 13, 2008, pp. 1-6.

Numenta, Inc., "Numenta Platform for Intelligent Computing: Programmer's Guide Version 1.0," Mar. 2007, seventy-seven pages.

Numenta, Inc., "NuPIC Update," Numenta HTM Workshop, 2009, twenty-four pages.

Numenta, Inc., "Prototype to Demonstrate Automated Insect Detection and Discrimination," Numenta HTM Workshop, 2009, four pages.

Numenta, Inc., "Smart Music: Combining Musical Expectations with Algorithmic Composition," Numenta HTM Workshop, 2009, seven pages.

Numenta, Inc., "Technical Keynote," Numenta HTM Workshop, 2009, seventy-two pages.

Numenta, Inc., "Temporal Model Characteristics," Numenta HTM Workshop, 2009, fourteen pages.

Numenta, Inc., "What Have We Worked on Since the 2008 Workshop? Customer Applications Presentation," Numenta HTM Workshop, 2009, thirty-five pages.

Numenta, Inc., "Zeta1 Algorithms Reference, Version 1.0," Numenta Inc., Mar. 1, 2007, pp. 1-36.

Numenta, Inc., "Zeta1 Algorithms Reference, Version 1.2," Numenta Inc., Jun. 8, 2007, pp. 1-38.

Numenta, Inc., "Zeta1 Algorithms Reference, Version 1.3," Numenta Inc., Aug. 22, 2007, pp. 1-41.

Numenta, Inc., "Zeta1 Algorithms Reference, Version 1.5," Numenta Inc., Aug. 24, 2007, pp. 1-45.

Olshausen, B.A. et al., "A Neurobiological Model of Visual Attention and Invariant Pattern Recognition Based on Dynamic Routing Information," Journal of Neuroscience, Nov. 1993, pp. 4700-4719, vol. 13, No. 11.

Park, S. et al., "Recognition of Two-person Interactions Using a Hierarchical Bayesian Network," ACM SIGMM International Workshop on Video Surveillance (IWVS) 2003, pp. 65-76, Berkeley, USA.

Pearl, J., "Probabilistic Reasoning in Intelligent Systems: Networks of Plausible Inference," 1988, pp. 143-223, Morgan Kaufmann Publishers, Inc.

Pilka, F. et al., "Multi-step Ahead Prediction Using Neural Networks," 53.sup.rd International Symposium ELMAR-2011, Sep. 14-16, 2011, pp. 269-272, Zadar, Croatia.

Poppel, E., "A Hierarchical Model of Temporal Perception," Trends in Cognitive Sciences, May 1997, pp. 56-61, vol. 1, No. 2.

Poritz, A., "Linear Predictive Hidden Markov Models and the Speech Signal," IEEE, 1982, pp. 1291-1294.

Rachkovskij, D.A., "Representation and Processing of Structures with Binary Sparse Distributed Codes," IEEE Transactions on Knowledge and Data Engineering, vol. 13, No. 2, Apr. 2001, pp. 261-276.

Rao, R. et al., "Predictive Coding in the Visual Cortex: A Functional Interpretation of Some Extra-classical Receptive-field Effects," Nature Neuroscience, Jan. 1999, pp. 79-87, vol. 2, No. 1.

Riesenhuber, M. et al., "Hierarchical Models of Object Recognition in Cortex," Nature Neuroscience, Nov. 1999, pp. 1019-1025, vol. 2, No. 11.

Rinkus, G., "Hierarchical Sparse Distributed Representations of Sequence Recall and Recognition," 2006, pp. 1-49.

Robinson, D. et al., "Spoken Language Identification with Hierarchical Temporal Memories," 2009 CS229 Course on Machine Learning at Stanford University, Dec. 11, 2009, five pages. [Online] [Retrieved Sep. 19, 2013] Retrieved from the Internet <URL: http://cs229.stanford.edu/proj2009/FalcoLeungRobinson.pdf.>.

Rojas, R., "Neural Networks, A Systematic Approach," Springer-Verlag, 1996, pp. 20-21, 110-112, and 311-319.

Ross, L., "Discovering and Using Patterns in Plant Floor Data," Numenta HTM Workshop, Jun. 23-24, 2008, SRI Campus, Menlo Park, CA, twelve pages.

Rozell, C.J. et al., "Sparse Coding Via Thresholding and Local Competition in Neural Circuits," Neural Computation, 2008, pp. 2526-2563, vol. 20, No. 10.

Saphir, B. "Numenta Web Services," Numenta HTM Workshop, 2009, twenty pages.

Saphir, B., "Power NuPIC Part II, How to Create a New Node Type," Numenta, Jun. 2008, Numenta HTM Workshop, Jun. 23-24, 2008, SRI Campus, Menlo Park, CA, thirty-two pages.

Sinha, P. et al., "Recovering Reflectance and Illumination in a World of Painted Polyhedra," Fourth International Conference on Computer Vision, Berlin, May 11-14, 1993, pp. 156-163, IEEE Computer Society Press, Los Alamitos, CA.

Spence, C. et al., "Varying Complexity in Tree-Structured Image Distribution Models," IEEE Transactions on Image Processing, Feb. 2006, pp. 319-330, vol. 15, No. 2.

Starzyk, J.A. et al., "Spatio-Temporal Memories for Machine Learning: A Long-Term Memory Organization," IEEE Transactions on Neural Networks, May 2009, pp. 768-780, vol. 20, No. 5.

(56) References Cited

OTHER PUBLICATIONS

Stringer, S.M. et al., "Invariant Object Recognition in the Visual System with Novel Views of 3D Objects," Neural Computation, Nov. 2002, pp. 2585-2596, vol. 14, No. 11.

Sudderth, E.B. et al., "Nonparametric Belief Propagation and Facial Appearance Estimation," AI Memo 2002-020, Dec. 2002, Artificial Intelligence Laboratory, Massachusetts Institute of Technology, Cambridge, Ma, USA, eleven pages.

Thomson, A.M. et al., "Interlaminar Connections in the Neocortex," Cerebral Cortex, 2003, pp. 5-14, vol. 13, No. 1.

Thornton, J. et al., "Robust Character Recognition Using a Hierarchical Bayesian Network," Proceedings of the 19.sup.th Australian Joint Conference on Artifical Intelligence, 2006, pp. 1259-1264.

Tsinarakis, G.J. et al. "Modular Petri Net Based Modeling, Analysis and Synthesis of Dedicated Production Systems," Proceedings of the 2003 IEEE International Conference on Robotics and Automation, Sep. 14-19, 2003, pp. 3559-3564, Taipei, Taiwan.

Tsinarakis, G.J. et al. "Modular Petri Net Based Modeling, Analysis, Synthesis and Performance Evaluation of Random Topology Dedicated Production Systems," Journal of Intelligent Manufacturing, 2005, vol. 16, pp. 67-92.

Tsukada, M, "A Theoretical Model of the Hippocampal-Cortical Memory System Motivated by Physiological Functions in the Hippocampus", Proceedings of the 1993 International Joint Conference on Neural Networks, Oct. 25, 1993, pp. 1120-1123, vol. 2.

Van Essen, D.C. et al., "Information Processing Strategies and Pathways in the Primate Visual System," An Introduction to Neural and Electronic Networks, 1995, pp. 45-76.

Vaught, T.N., "Software Design in Scientific Computing," Jun. 23, 2008, Numenta HTM Workshop, Jun. 23-24, 2008, SRI Campus, Menlo Park, CA, thirty-two pages.

Vlajic, "Vector Quantization of Images Using Modified Adaptive Resonance Algorithm for Hierarchical Clustering," IEEE Transactions on Neural Networks, 2001, pp. 1147-1162, vol. 12, No. 5.

Weiss, R. et al., "HyPursuit: A Hierarchical Network Search Engine that Exploits Content-Link Hypertext Clustering," Proceedings of the Seventh Annual ACM Conference on Hypertext, Mar. 16-20, 1996, pp. 180-193, Washington, D.C., USA.

Wiskott, L. et al., "Slow Feature Analysis: Unsupervised Learning of Invariances," Neural Computation, 2002, pp. 715-770, vol. 14, No. 4.

Wu, G. et al., "Multi-camera Spatio-temporal Fusion and Biased Sequence-data Learning for Security Surveillance," Association for Computing Machinery, 2003, pp. 528-538.

Yedidia, J.S. et al., "Understanding Belief Propagation and its Generalizations," Joint Conference on Artificial Intelligence (IJCAI 2001), Aug. 4-10, 2001, Seattle, WA, USA, thirty-five pages.

Zayyani, H. et al., "Bayesian Pursuit Algorithm for Sparse Representation," 2009 IEEE International Conference on Acoustics, Speech and Signal Processing, ICASSP 2009, IEEE, 2009, pp. 1549-1552.

Zemel, R.S., "Cortical Belief Networks," Computational Models for Neuroscience, 2003, pp. 267-287, Hecht-Nielsen, R. et al., eds., Springer-Verlag, New York.

Zhang, R. et al., "Bayesian methodology for reliability model acceptance," Reliability Engineering & System Safety, 2003, pp. 95-103, vol. 80.

PCT International Search Report and Written Opinion, PCT Application No. PCT/IB2022/056158, Oct. 6, 2022, 13 pages.

Weng et al., "A Quality-Oriented Reconfigurable Convolution Engine Using Cross-Shaped Sparse Kernels for Highly-Parallel CNN Acceleration," 2021 IEEE 3rd International Conference on Artificial Intelligence Circuits and Systems (AICAS), Jun. 2021, pp. 1-4, doi: 10.1109/AICAS51828.2021.9458472. (Year: 2021).

Sarge et al., Tips for Optimizing GPU Performance Using Tensor Cores, Feb. 2021, NVIDIA Developer Blog https :/ /developer. nvidia.com/blog/optimizing-gpu-performance-tensor-cores/.

* cited by examiner

200

Input Layer
202

Hidden Layers
206

Output Layer
204

210

240

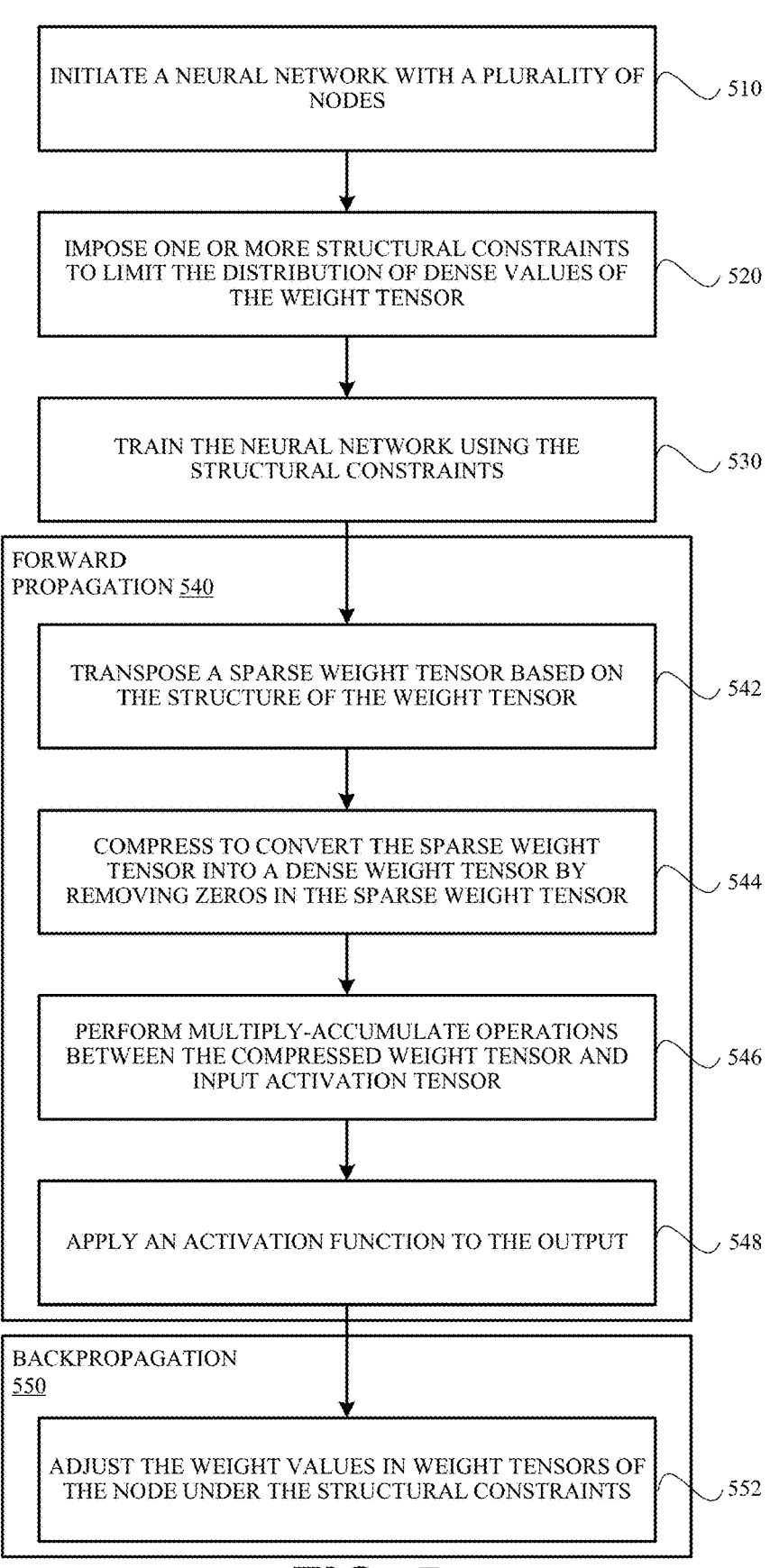

INITIATE A NEURAL NETWORK WITH A PLURALITY OF NODES — 510

IMPOSE ONE OR MORE STRUCTURAL CONSTRAINTS TO LIMIT THE DISTRIBUTION OF DENSE VALUES OF THE WEIGHT TENSOR — 520

TRAIN THE NEURAL NETWORK USING THE STRUCTURAL CONSTRAINTS — 530

FORWARD PROPAGATION 540

TRANSPOSE A SPARSE WEIGHT TENSOR BASED ON THE STRUCTURE OF THE WEIGHT TENSOR — 542

COMPRESS TO CONVERT THE SPARSE WEIGHT TENSOR INTO A DENSE WEIGHT TENSOR BY REMOVING ZEROS IN THE SPARSE WEIGHT TENSOR — 544

PERFORM MULTIPLY-ACCUMULATE OPERATIONS BETWEEN THE COMPRESSED WEIGHT TENSOR AND INPUT ACTIVATION TENSOR — 546

APPLY AN ACTIVATION FUNCTION TO THE OUTPUT — 548

BACKPROPAGATION 550

ADJUST THE WEIGHT VALUES IN WEIGHT TENSORS OF THE NODE UNDER THE STRUCTURAL CONSTRAINTS — 552

FIG. 5

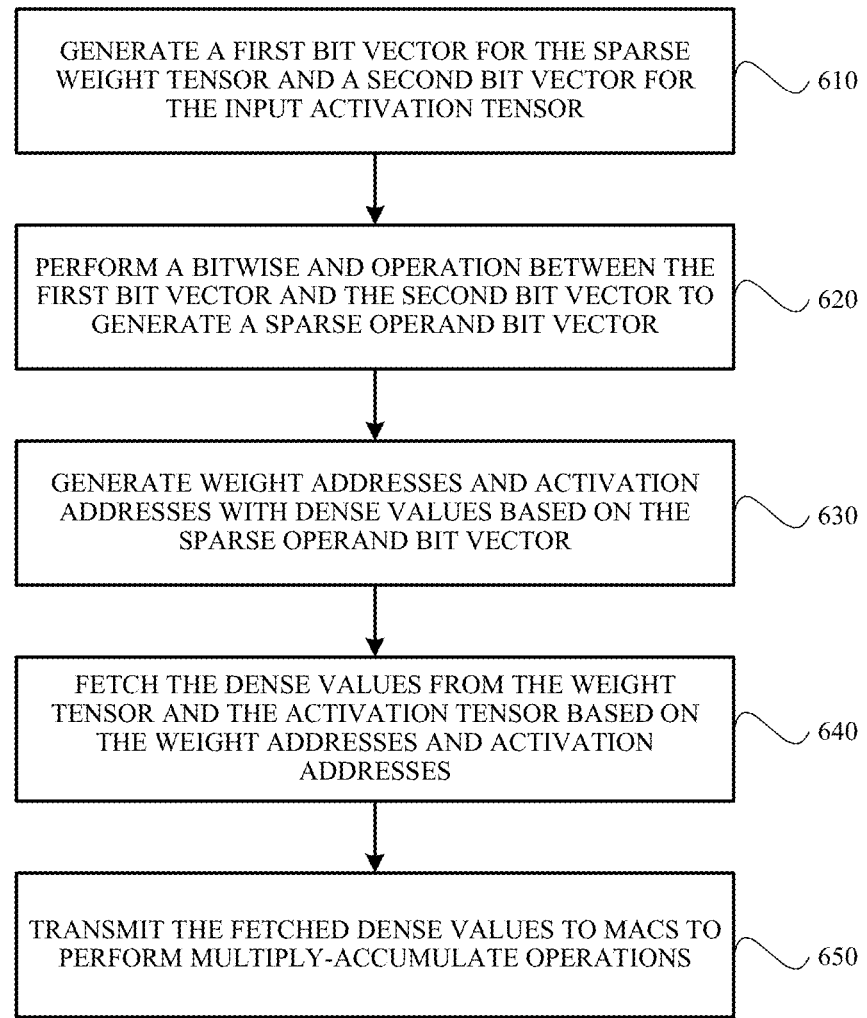

GENERATE A FIRST BIT VECTOR FOR THE SPARSE
WEIGHT TENSOR AND A SECOND BIT VECTOR FOR
THE INPUT ACTIVATION TENSOR    610

PERFORM A BITWISE AND OPERATION BETWEEN THE
FIRST BIT VECTOR AND THE SECOND BIT VECTOR TO
GENERATE A SPARSE OPERAND BIT VECTOR    620

GENERATE WEIGHT ADDRESSES AND ACTIVATION
ADDRESSES WITH DENSE VALUES BASED ON THE
SPARSE OPERAND BIT VECTOR    630

FETCH THE DENSE VALUES FROM THE WEIGHT
TENSOR AND THE ACTIVATION TENSOR BASED ON
THE WEIGHT ADDRESSES AND ACTIVATION
ADDRESSES    640

TRANSMIT THE FETCHED DENSE VALUES TO MACS TO
PERFORM MULTIPLY-ACCUMULATE OPERATIONS    650

FIG. 6

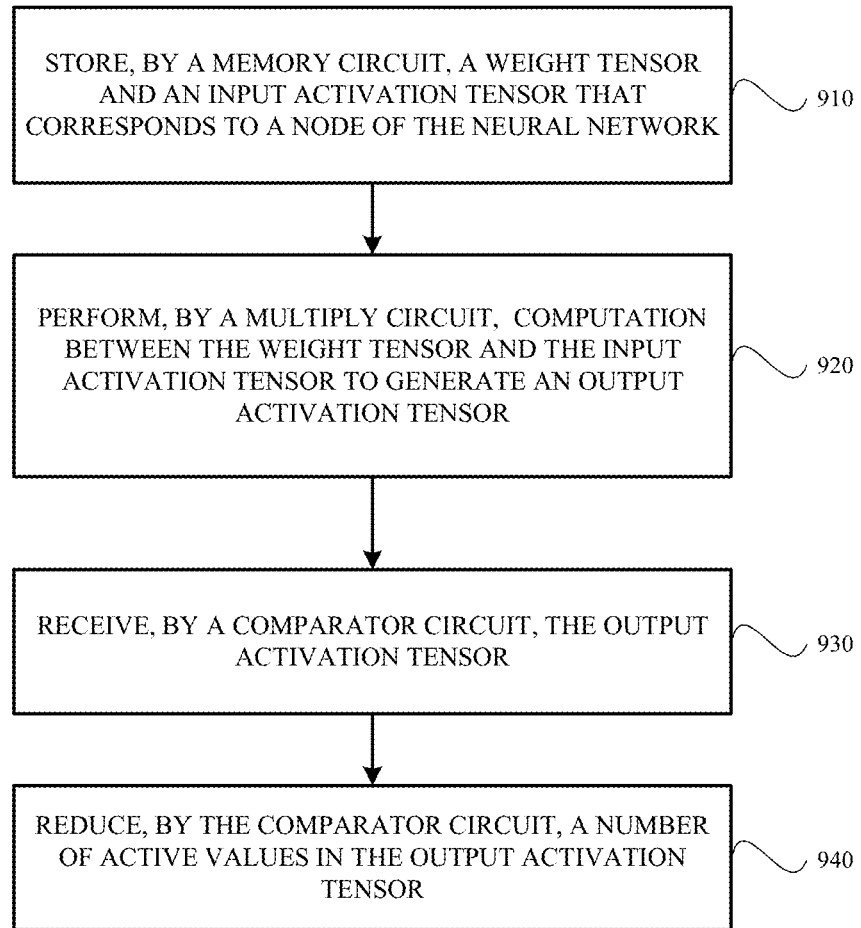

STORE, BY A MEMORY CIRCUIT, A WEIGHT TENSOR AND AN INPUT ACTIVATION TENSOR THAT CORRESPONDS TO A NODE OF THE NEURAL NETWORK — 910

PERFORM, BY A MULTIPLY CIRCUIT, COMPUTATION BETWEEN THE WEIGHT TENSOR AND THE INPUT ACTIVATION TENSOR TO GENERATE AN OUTPUT ACTIVATION TENSOR — 920

RECEIVE, BY A COMPARATOR CIRCUIT, THE OUTPUT ACTIVATION TENSOR — 930

REDUCE, BY THE COMPARATOR CIRCUIT, A NUMBER OF ACTIVE VALUES IN THE OUTPUT ACTIVATION TENSOR — 940

FIG. 9

HARDWARE ARCHITECTURE FOR INTRODUCING ACTIVATION SPARSITY IN NEURAL NETWORK

CROSS-REFERENCE TO RELATED APPLICATIONS

The present application claims the benefit of U.S. Provisional Patent Application 63/087,644, filed on Oct. 5, 2020, which is hereby incorporated by reference in its entirety.

BACKGROUND

1. Field of the Disclosure

The present disclosure relates to learning and processing neural networks, and more specifically to hardware architecture that is efficient at performing operations related to sparse neural networks.

2. Description of the Related Arts

The use of artificial neural networks (ANN), or simply neural networks, includes a vast array of technologies. An ANN's complexity, in terms of the number of parameters, is growing exponentially at a faster rate than hardware performance. In many cases, an ANN may have a large number of parameters. Training and inference on these networks are bottlenecked by massive linear tensor operations, multiplication and convolution. Consequently, a large amount of time and/or resources may be used for both ANN creation (e.g., training) and execution (e.g., inference).

Computing systems that execute ANNs often involve extensive computing operations including multiplication and accumulation. For example, CNN is a class of machine learning techniques that primarily uses convolution between input data and kernel data, which can be decomposed into multiplication and accumulation operations. Using a central processing unit (CPU) and its main memory to instantiate and execute machine learning systems or models of various configurations is relatively easy because such systems or models can be instantiated with mere updates to code. However, relying solely on the CPU for various operations of these machine learning systems or models would consume significant bandwidth of a central processing unit (CPU) as well as increase the overall power consumption.

SUMMARY

Embodiments relate to an artificial intelligence (AI) accelerator for performing operations related to a sparse neural network. The AI accelerator may include a memory circuit configured to store a weight tensor and an input activation tensor that corresponds to a node of the neural network. The AI accelerator may also include a multiply circuit coupled to the memory circuit. The multiply circuit is configured to perform a computation between the weight tensor and the input activation tensor to generate an output activation tensor. The AI accelerator may further include a comparator circuit coupled to the multiply circuit. The comparator circuit is configured to receive the output activation tensor and reduce a number of active values in the output activation tensor.

In one embodiment, the comparator circuit is configured to reduce the number of active values in the output activation tensor globally by selecting a limited number of active values in the entirety of the output activation tensor.

In one embodiment, the comparator circuit is configured to reduce the number of active values in the output activation tensor locally by dividing the output activation tensor into a plurality of subsets and selecting, for each subset, a limited number of active values in the subset.

In one embodiment, the output activation tensor is divided based on kernels corresponding to the node of the neural network. Each subset corresponds a result of the computation with a kernel.

In one embodiment, the number of active values is different for the node and that of a second node.

In one embodiment, the comparator circuit is configured to reduce the number of active values by receiving a stream of values in the output activation tensor, sorting the stream of values to a sorted number of values, and discarding values that are not selected in the sorted number of values.

In one embodiment, the sorted number of values are stored as a linked list in a pointer array.

In one embodiment, the comparator circuit is configured to reduce the number of active values by storing values in the output activation tensor in a buffer array, selecting the number of active values, and setting remaining of the values in the output activation tensor that are not selected to zero.

In one embodiment, the comparator circuit comprises a comparator tree circuit that is configured to select the highest value from a set of values. The comparator circuit is configured to select the number of active values by repeatedly running the comparator tree circuit until the selected active values reach the number.

In one embodiment, the comparator circuit is configured to reduce the number of active values in the output activation tensor by restricting the output activation tensor to have a structure that defines a distribution of the active values.

In one embodiment, the active values are distributed in a block structure in which the output activation tensor is divided into a plurality of blocks. Each block includes a plurality of values. Each block is either active or inactive. In an active block, at least one of the values is active. In an inactive block, all of the values are inactive.

In one embodiment, the comparator circuit is configured to reduce the number of active values in the output activation tensor by selecting a number of active blocks. Each selected active block is selected based on an aggregated value of the selected active block.

In one embodiment, the comparator circuit is configured to reduce the number of active values in the output activation tensor by determining a threshold value for selecting values to remain active, maintaining values in the output activation tensor that are larger than the threshold value, and setting remaining values in the output activation tensor to zeros.

In one embodiment, the comparator circuit is configured to reduce the number of active values by storing values in the output activation tensor in a buffer array, creating a histogram of the values, determining a threshold value based on the histogram, and setting the values that are smaller than the threshold value as zero.

In one embodiment, one or more values in the output activation tensor are equal. The comparator circuit is configured to apply one or more tie-breaker criteria to determine which of the one or more equal values is selected.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

FIG. 5 is a flowchart depicting an example process for performing operations related to a sparse neural network, according to an embodiment.

FIG. 6 is a flowchart depicting an example process for performing operations related to a sparse-sparse node in a neural network, according to an embodiment.

FIG. 9 is a flowchart depicting an example process for performing operations related to a sparse neural network, according to an embodiment.

DETAILED DESCRIPTION OF EMBODIMENTS

Figure 1:
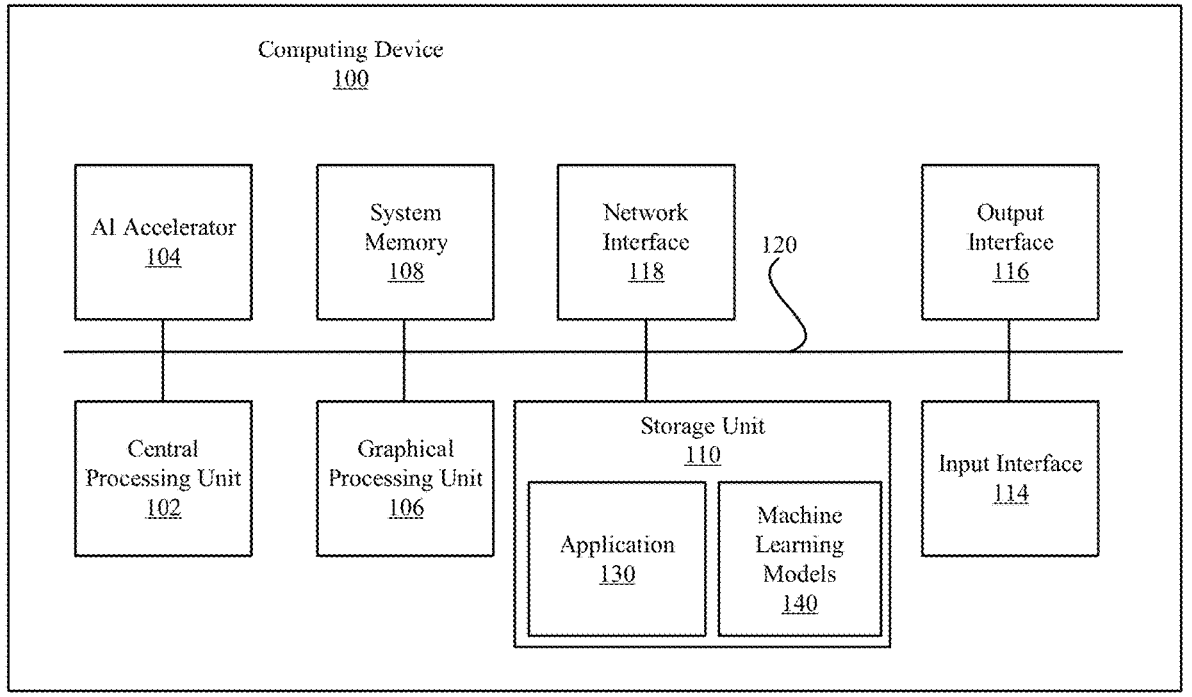
FIG. 1 is a block diagram of a computing device, according to some embodiments.

In the following description of embodiments, numerous specific details are set forth in order to provide more thorough understanding. However, note that the present invention may be practiced without one or more of these specific details. In other instances, well-known features have not been described in detail to avoid unnecessarily complicating the description.

A preferred embodiment is now described with reference to the figures where like reference numbers indicate identical or functionally similar elements. Also in the figures, the left-most digit of each reference number corresponds to the figure in which the reference number is first used.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to the desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. A computer readable medium is a non-transitory medium that does not include propagation signals and transient waves. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, embodiments are not described with reference to any particular programming language. It will be appreciated that a variety of programming languages may be used to implement the teachings as described herein, and any references below to specific languages are provided for disclosure of enablement and best mode of the embodiments.

In addition, the language used in the specification has been principally selected for readability and instructional purposes, and may not have been selected to delineate or circumscribe the inventive subject matter. Accordingly, the disclosure set forth herein is intended to be illustrative, but not limiting, of the scope, which is set forth in the claims.

Embodiments relate to the architecture of an artificial intelligence (AI) accelerator that is efficient at processing sparse nodes of a neural network. A sparse node may include a sparse tensor that has a low density of active values. In using a generic processor, the computation operation of a tensor, sparse or dense, may include computing the value in the tensor one by one. However, in a sparse tensor, many values in the tensor are inactive (e.g., zeros) and computation with such inactive values can be skipped. The AI accelerator may perform a sparse activation to reduce the number of active values in an output tensor that corresponds to the output of a node of the neural network. The sparse activation may include a K-winner approach, which keeps a number (K) of the largest values in the tensor and sets the rest of the values to zeros. The AI accelerator may include an architecture that is efficient at performing a K-winner approach.

Example Computing Device Architecture

FIG. 1 is a block diagram of an example computing device 100 for processing one or more sparse neural networks, according to an embodiment. A computing device 100 may be a server computer, a personal computer, a portable electronic device, a wearable electronic device (e.g., a smartwatch), an IoT device (e.g., a sensor), smart/connected appliance (e.g., a refrigerator), dongle, a device in edge computing, a device with limited processing power, etc. The computing device 100 may include, among other components, a central processing unit (CPU) 102, an artificial intelligence accelerator (AI accelerator) 104, a graphical processing unit (GPU) 106, system memory 108, a storage unit 110, an input interface 114, an output interface 116, a network interface 118, and a bus 120 connecting these components. In various embodiments, computing device 100 may include additional, fewer or different components.

While some of the components in this disclosure may at times be described in a singular form while other components may be described in a plural form, various components described in any system may include one or more copies of the components. For example, a computing device 100 may include more than one processor such as CPU 102, AI accelerator 104, and GPU 106, but the disclosure may refer the processors to as "a processor" or "the processor." Also, a processor may include multiple cores.

CPU 102 may be a general-purpose processor using any appropriate architecture. CPU 102 retrieves and executes computer code that includes instructions, when executed, that may cause CPU 102 or another processor, individually or in combination, to perform certain actions or processes that are described in this disclosure. Instructions can be any directions, commands, or orders that may be stored in different forms, such as equipment-readable instructions, programming instructions including source code, and other communication signals and orders. Instructions may be used in a general sense and are not limited to machine-readable codes. CPU 102 may be used to compile the instructions and also determine which processors may be used to performed certain tasks based on the commands in the instructions. For example, certain machine learning computations may be more efficient to be processed using AI accelerator 104 while other parallel computations may be better to be processed using GPU 106.

AI accelerator 104 may be a processor that is efficient at performing certain machine learning operations such as tensor multiplications, convolutions, tensor dot products, etc. In various embodiments, AI accelerator 104 may have different hardware architectures. For example, in one embodiment, AI accelerator 104 may take the form of field-programmable gate arrays (FPGAs). In another embodiment, AI accelerator 104 may take the form of application-specific integrated circuits (ASICs), which may include circuits along or circuits in combination with firmware.

GPU 106 may be a processor that includes highly parallel structures that are more efficient than CPU 102 at processing large blocks of data in parallel. GPU 106 may be used to process graphical data and accelerate certain graphical operations. In some cases, owing to its parallel nature, GPU 106 may also be used to process a large number of machine learning operations in parallel. GPU 106 is often efficient at performing the same type of workload many times in rapid succession.

While, in FIG. 1, the processors CPU 102, AI accelerator 104, and GPU 106 are illustrated as separated components, in various embodiments the structure of one processor may be embedded in another processor. For example, one or more examples of the circuitry of AI accelerator 104 disclosed in different figures of this disclosure may be embedded in a CPU 102. The processors may also be included in a single chip such as in a system-on-a-chip (SoC) implementation. In various embodiments, computing device 100 may also include additional processors for various specific purposes. In this disclosure, the various processors are collectively referred to as "processors" or "a processor."

System memory 108 includes circuitry for storing instructions for execution by a processor and for storing data processed by the processor. System memory 180 may take the form of any type of memory structure including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. System memory 108 usually takes the form of volatile memory.

Storage unit 110 may be a persistent storage for storing data and software applications in a non-volatile manner. Storage unit 110 may take the form of read-only memory (ROM), hard drive, flash memory, or another type of non-volatile memory device. Storage unit 110 stores the operating system of the computing device 100, various software applications 130 and machine learning models 140. Storage unit 110 may store computer code that includes instructions that, when executed, cause a processor to perform one or more processes described in this disclosure.

Applications 130 may be any suitable software applications that operate at the computing device 100. An application 130 may be in communication with other devices via network interface 118. Applications 130 may be of different types. In one case, an application 130 may be a web application, such as an application that runs on JavaScript. In another case, an application 130 may be a mobile application. For example, the mobile application may run on Swift for iOS and other APPLE operating systems or on Java or another suitable language for ANDROID systems. In yet another case, an application 130 may be a software program that operates on a desktop operating system such as LINUX, MICROSOFT WINDOWS, MAC OS, or CHROME OS. In yet another case, an application 130 may be a built-in application in an IoT device. An application 130 may include a graphical user interface (GUI) that visually renders data and information. An application 130 may include tools for training machine leaning models 140 and/or perform inference using the trained machine learning models 140.

Machine learning models 140 may include different types of algorithms for making inferences based on the training of the models. Examples of machine learning models 140 include regression models, random forest models, support vector machines (SVMs) such as kernel SVMs, and artificial neural networks (ANNs) such as convolutional network networks (CNNs), recurrent network networks (RNNs), autoencoders, long short term memory (LSTM), reinforcement learning (RL) models. Some of the machine learning models may include a sparse network structure whose detail will be further discussed with reference to FIG. 2B through 2D. A machine learning model 140 may be an independent model that is run by a processor. A machine learning model 140 may also be part of a software application 130. Machine learning models 140 may perform various tasks.

By way of example, a machine learning model 140 may receive sensed inputs representing images, videos, audio signals, sensor signals, data related to network traffic, financial transaction data, communication signals (e.g., emails, text messages and instant messages), documents, insurance records, biometric information, parameters for manufacturing process (e.g., semiconductor fabrication parameters), inventory patterns, energy or power usage patterns, data representing genes, results of scientific experiments or parameters associated with the operation of a machine (e.g., vehicle operation) and medical treatment data. The machine learning model 140 may process such inputs and produce an output representing, among others, identification of objects shown in an image, identification of recognized gestures, classification of digital images as pornographic or non-pornographic, identification of email messages as unsolicited bulk email ('spam') or legitimate email ('non-spam'), prediction of a trend in financial market, prediction of failures in a large-scale power system, identification of a speaker in an audio recording, classification of loan applicants as good or bad credit risks, identification of network traffic as malicious or benign, identity of a person appearing in the image, processed natural language processing, weather forecast results, patterns of a person's behavior, control signals for machines (e.g., automatic vehicle navigation), gene expression and protein interactions, analytic information on access to resources on a network, parameters for optimizing a manufacturing process, predicted inventory, predicted energy usage in a building or facility, web analytics (e.g., predicting which link or advertisement that users are likely to click), identification of anomalous patterns in insurance records, prediction on results of experiments, indication of illness that a person is likely to experience, selection of contents that may be of interest to a user, indication on prediction of a person's behavior (e.g., ticket purchase, no-show behavior), prediction on election, prediction/detection of adverse events, a string of texts in the image, indication representing topic in text, and a summary of text or prediction on reaction to medical treatments. The underlying representation (e.g., photo, audio and etc.) can be stored in system memory 108 and/or storage unit 110.

Input interface 114 receives data from external sources such as sensor data or action information. Output interface 116 is a component for providing the result of computations in various forms (e.g., image or audio signals). Computing device 100 may include various types of input or output interfaces, such as displays, keyboards, cameras, microphones, speakers, antennas, fingerprint sensors, touch sensors, and other measurement sensors. Some input interface 114 may directly work with a machine learning model 140 to perform various functions. For example, a sensor may use a machine learning model 140 to infer interpretations of measurements. Output interface 116 may be in communication with humans, robotic agents or other computing devices.

The network interface 118 enables the computing device 100 to communicate with other computing devices via a network. The networks may include, but are not limited to, Local Area Networks (LANs) (e.g., an Ethernet or corporate network) and Wide Area Networks (WANs). When multiple nodes or components of a single node of a machine learning model 140 is embodied in multiple computing devices, information associated with various processes in the machine learning model 140, such as temporal sequencing, spatial pooling and management of nodes may be communicated between computing devices via the network interface 118.

Example Neural Network Architecture

Figure 2A:
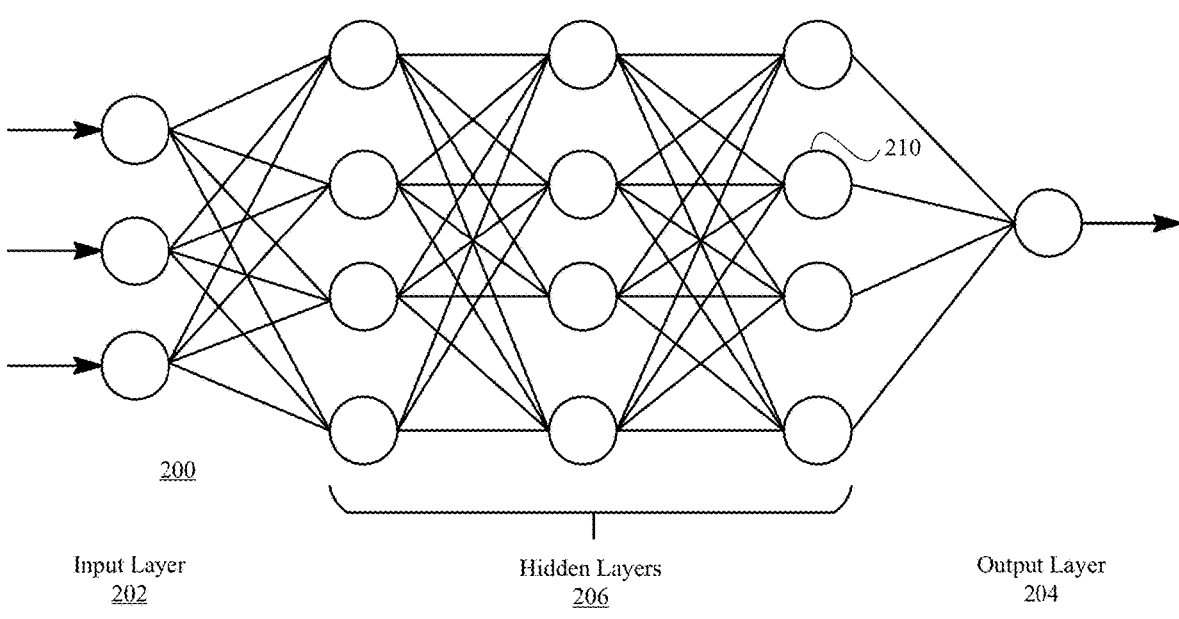
FIG. 2A is a conceptual diagram illustrating an example architecture of a neural network, according to an embodiment.

FIG. 2A is a conceptual diagram illustrating an example architecture of a neural network 200, according to an embodiment. The illustrated neural network 200 shows a generic structure of a neural network. Neural network 200 may represent different types of neural networks, including convolutional network networks (CNNs), recurrent network networks (RNNs), autoencoders, and long short term memory (LSTM). In various embodiments, customized changes may be made to this general structure. Neural network 200 may also be a hierarchical temporal memory system as described, for example, in U.S. Patent Application Publication No. 2020/0097857, published on May 26, 2020, which is incorporated hereto by reference in its entirety.

Neural network 200 includes an input layer 202, an output layer 204 and one or more hidden layers 206. Input layer 202 is the first layer of neural network 200. Input layer 202 receives input data, such as image data, speech data, text, etc. Output layer 204 is the last layer of neural network 200. Output layer 204 may generate one or more inferences in the form of classifications or probabilities. Neural network 200 may include any number of hidden layers 206. Hidden layer 200 are intermediate layers in neural network 200 that perform various operations. Neural network 200 may include additional or fewer layers than the example shown in FIG. 2A. Each layer may include one or more nodes 210. The number of nodes in each layer in the neural network 200 shown in FIG. 2A is an example only. A node 210 may be associated with certain weights and activation functions. In various embodiments, the nodes 210 in neural network 200 may be fully connected or partially connected.

Each node 210 in neural network 200 may be associated with different operations. For example, in a simple form, neural network 200 may be a vanilla neural network whose nodes are each associated with a set of linear weight coefficients and an activation function. In another embodiment, neural network 200 may be an example convolutional neural network (CNN). In this example CNN, nodes 210 in one layer may be associated with convolution operations with kernels as weights that are adjustable in the training process. Nodes 210 in another layer may be associated with spatial pooling operations. In yet another embodiment, neural network 200 may be a recurrent neural network (RNN) whose nodes may be associated with more complicated structures such as loops and gates. In a neural network 200, each node may represent a different structure and have different weight values and a different activation function.

Figure 2B:
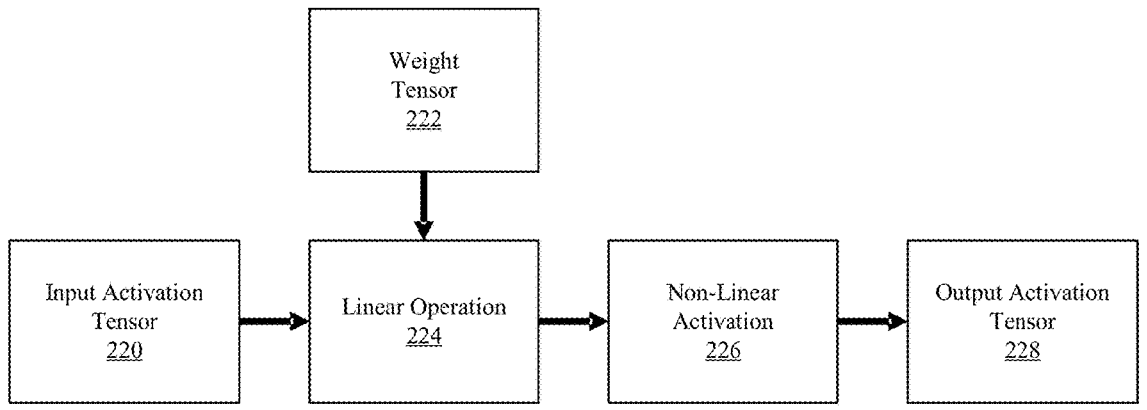
FIG. 2B is a block diagram illustrating an example general operation of a node in a neural network, according to an embodiment.

FIG. 2B is a block diagram illustrating an example general operation of a node 210 in neural network 200, according to an embodiment. A node 210 may receive an input activation tensor 220, which can be an N-dimensional tensor, where N can be greater than or equal to one. Input activation tensor 220 may be the input data of neural network 200 if node 210 is in the input layer 202. Input activation tensor 220 may also be the output of another node in the preceding layer. Node 210 may apply a weight tensor 222 to input activation tensor 220 in a linear operation 224, such as addition, scaling, biasing, tensor multiplication, and convolution in the case of a CNN. The result of linear operation 224 may be processed by a non-linear activation 226 such as a step function, a sigmoid function, a hyperbolic tangent function (tan h), and rectified linear unit functions (ReLU). The result of the activation is an output activation tensor 228 that is sent to a subsequent connected node that is in the next layer of neural network 200. The subsequent node uses output activation tensor 228 as the input activation tensor 220.

In various embodiments, a wide variety of machine learning techniques may be used in training neural network 200. Neural network 200 may be associated with an objective function (also commonly referred to as a loss function), which generates a metric value that describes the objective goal of the training process. The training may intend to reduce the error rate of the model in generating predictions. In such a case, the objective function may monitor the error rate of neural network 200. For example, in object recognition (e.g., object detection and classification), the objective function of neural network 200 may be the training error rate in classifying objects in a training set. Other forms of objective functions may also be used. In various embodiments, the error rate may be measured as cross-entropy loss, L1 loss (e.g., the sum of absolute differences between the predicted values and the actual value), L2 loss (e.g., the sum of squared distances) or their combinations.

The weights and coefficients in activation functions of neural network may be adjusted by training and also be constrained by sparsity and structural requirements. Sparsity will be further discussed with reference to FIG. 2C through 2E and structural requirements will be further discussed with reference to FIG. 4A. Training of neural network 200 may include forward propagation and backpropagation. In forward propagation, neural network 200 performs the computation in the forward direction based on outputs of a preceding layer. The operation of a node 210 may be defined by one or more functions, such as linear operation 224 and non-linear activation 226. The functions that define the operation of a node 210 may include various computation operations such as convolution of data with one or more kernels, pooling, recurrent loop in RNN, various gates in LSTM, etc. The functions may also include an activation function that adjusts the output of the node.

Each of the functions in neural network 200 may be associated with different coefficients (e.g., weights and kernel coefficients) that are adjustable during training. After an input is provided to neural network 200 and passes through neural network 200 in the forward direction, the results may be compared to the training labels or other values in the training set to determine the neural network's performance. The process of prediction may be repeated for other samples in the training sets to compute the overall value of the objective function in a particular training round. In turn, neural network 200 performs backpropagation by using gradient descent such as stochastic gradient descent (SGD) to adjust the coefficients in various functions to improve the value of the objective function.

Multiple rounds of forward propagation and backpropagation may be performed. Training may be completed when the objective function has become sufficiently stable (e.g., neural network 200 has converged) or after a predetermined number of rounds for a particular set of training samples. The trained neural network 200 can be used for making inferences or another suitable task for which the model is trained.

Figure 2C:
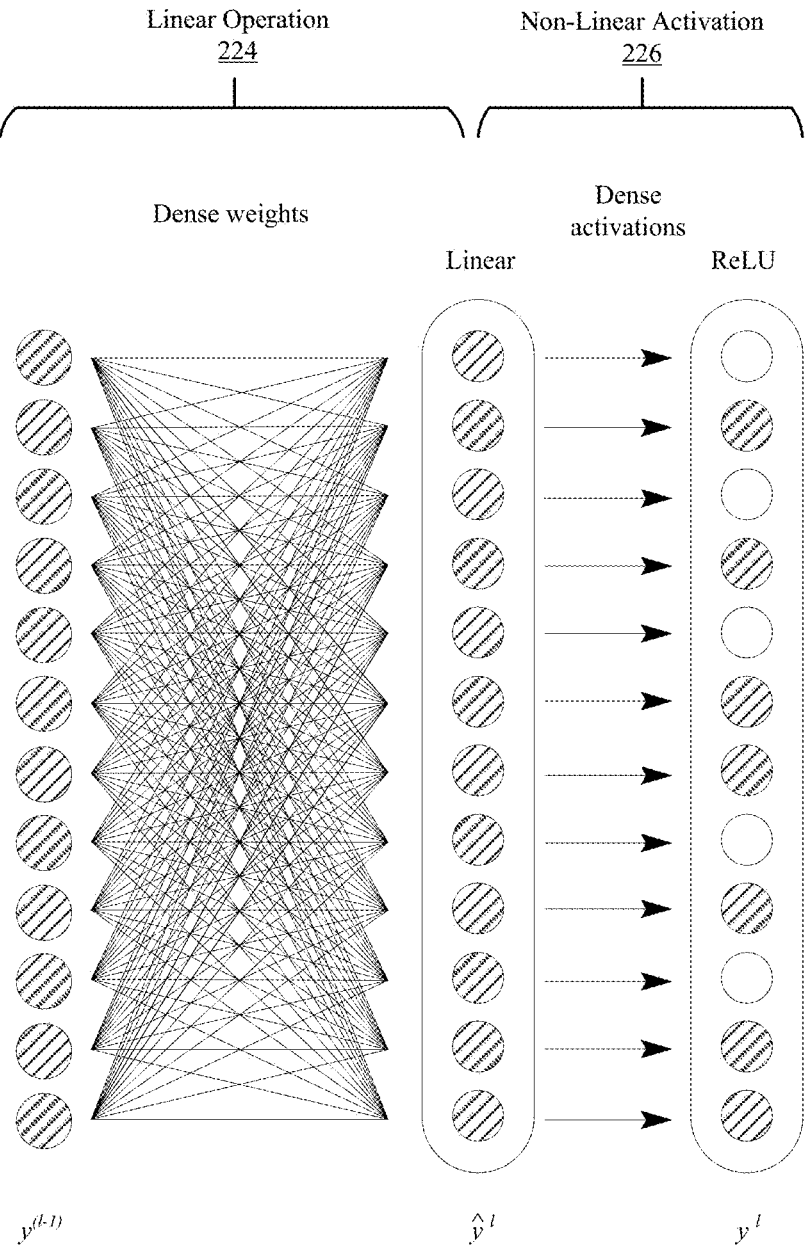
FIG. 2C through 2E illustrates the concept of sparsity in a neural network, according to an embodiment.
Figure 2D:
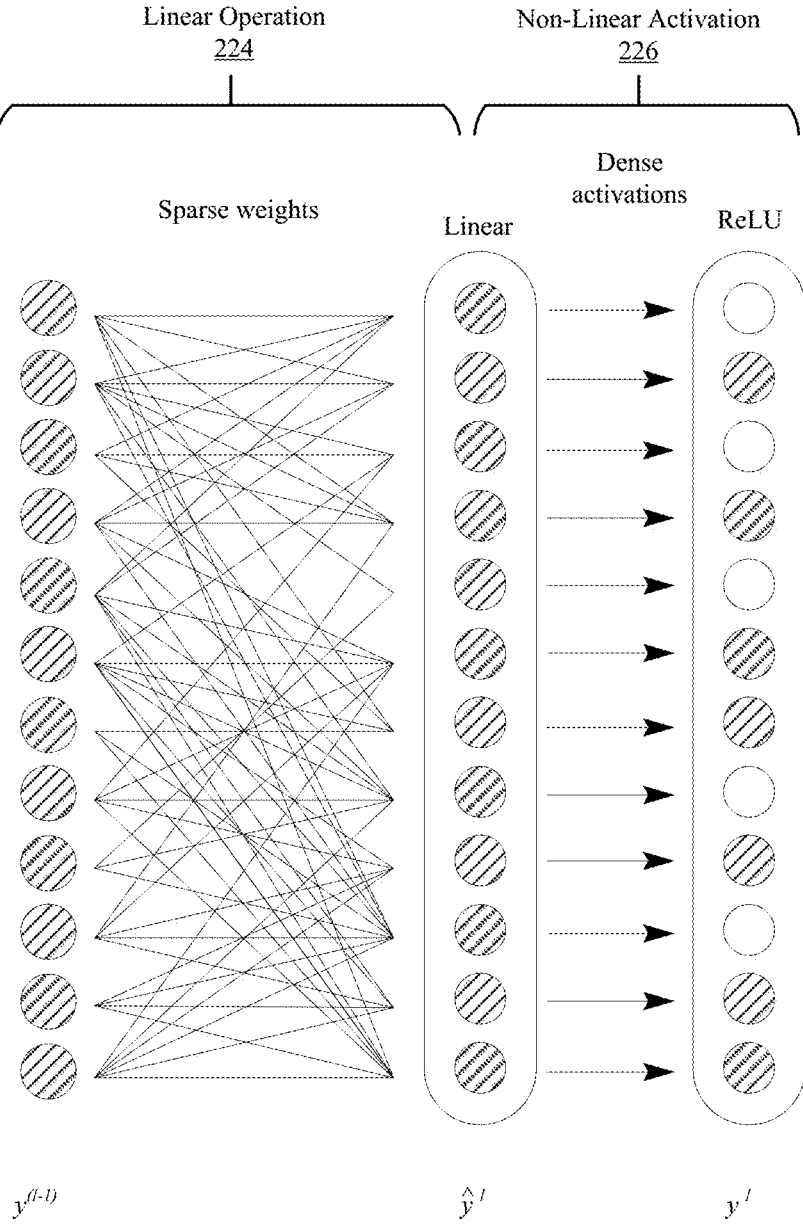
Figure 2E:
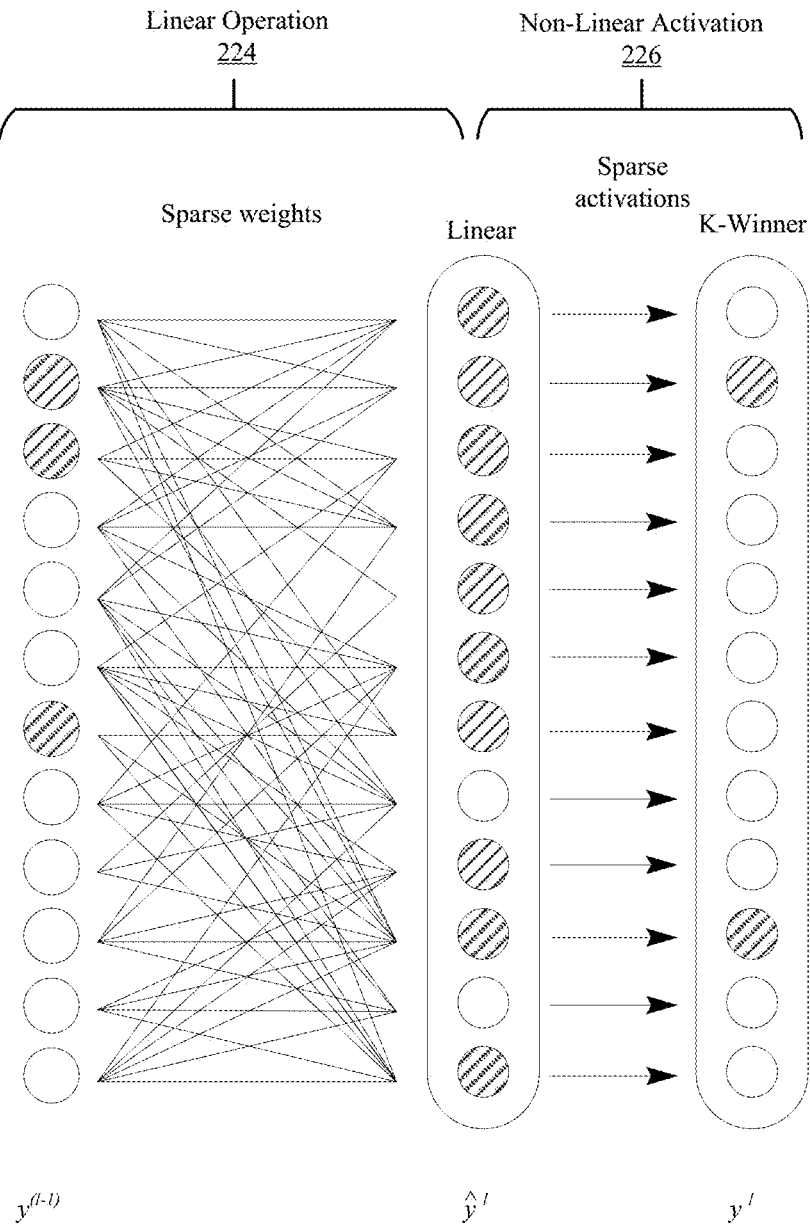

FIG. 2C through 2E illustrates the concept of sparsity in a neural network 200, according to various embodiments. Each of FIGS. 2C, 2D, and 2E shows the operation within a node 210 with different degrees of sparsity and is a graphical illustration of the flowchart shown in FIG. 2B. A circle in FIGS. 2C, 2D, and 2E represents a value in a tensor. In a neural network 200 with L hidden layers, the notation $y^l$ denotes output activation tensor 228 from layer l and $y^{l-1}$ denotes the output activation tensor 228 in the preceding layer l–1 or the input activation tensor 220 of layer l. $W^l$ and $u^l$ represent respectively the weight tensor 222 and biases for each node. In a neural network node 210 that has a dense weight tensor $W^l$, the feed-forward outputs are calculated as follow:

$$\hat{y}^l = W^l \cdot y^{l-1} + u^l \qquad \text{Equation 1}$$

$$y^l = f(\hat{y}^l) \qquad \text{Equation 2}$$

where f is any activation function, such as tan h or ReLU and $\hat{y}^l$ is the output of the linear operation before an activation function is applied.

The above relationship may be conceptually represented as a block diagram as illustrated in FIG. 2B. Graphically, a dense node with dense weights and a dense activation function such as tan h or ReLU is illustrated in FIG. 2C. In FIG. 2C, the result $\hat{y}^l$ after the linear operation is dense with most of the values being non-zero. The active values (e.g., non-zero values) are represented by the shaded circles. The activation function also results in a dense output $y^l$ in which a majority of the values are still active, which are also represented by the shaded circles.

Here, a value being active may refer to a value whose mathematical operation will need to be included in order to perform the overall computation. For example, in the context of matrix multiplication, convolution, or dot product, an active value may be a non-zero value because the mathematical operation, such as addition and multiplication, of the non-zero value will need to be included in order to get to the correct result of the matrix multiplication, convolution, or dot product. A value being inactive may refer to a value whose mathematical operation may be skipped. For example, in the context of matrix multiplication, convolution, or dot product, an inactive value is zero because the mathematical operation involving zero, such as addition and multiplication, may be skipped without affecting the final result. A weight tensor is dense if the percentage of active values in the tensor exceeds a threshold. Likewise, an activation is dense if the activation function will result in a number of output values in the output activation tensor $y^l$ being dense and the percentage of the active values exceeding a threshold. Using ReLU as an example, ReLU sets values that are lower than a level (e.g., 0) as 0 and allows values that are greater than the level to retain the values. Hence, it is expected that ReLU will generate about half active values if the values in the intermediate tensor $\hat{y}^l$ are roughly equally distributed around the level. A tensor output that has about half of the values being non-zero is often considered as dense. In FIG. 2C, since the weight tensor is dense and the activation layer will also generate a dense value, the node 240 can be considered as a weight-dense and activation-dense node 240, or simply referred to as dense-dense node 240.

The degree of sparsity for a tensor to be considered sparse may vary, depending on embodiments. In one embodiment, the number of active values in a tensor is fewer than 50% to be considered a sparse tensor. In one embodiment, the number of active values in a tensor is fewer than 40% to be considered a sparse tensor. In one embodiment, the number of active values in a tensor is fewer than 30% to be considered a sparse tensor. In one embodiment, the number of active values in a tensor is fewer than 20% to be considered a sparse tensor. The number of active values in a tensor is fewer than 15% to be considered a sparse tensor. The number of active values in a tensor is fewer than 10% to be considered a sparse tensor. The number of active values in a tensor is fewer than 5% to be considered a sparse tensor. The number of active values in a tensor is fewer than 4% to be considered a sparse tensor. The number of active values in a tensor is fewer than 3% to be considered a sparse tensor. The number of active values in a tensor is fewer than 3% to be considered a sparse tensor. The number of active values in a tensor is fewer than 2% to be considered a sparse tensor. The number of active values in a tensor is fewer than 1% to be considered a sparse tensor. The number of active values in a tensor is fewer than 0.8% to be considered a sparse tensor. The number of active values in a tensor is fewer than 0.5% to be considered a sparse tensor. The number of active values in a tensor is fewer than 0.2% to be considered a sparse tensor. The number of active values in a tensor is fewer than 0.1% to be considered a sparse tensor. The number of active values in a tensor is fewer than 0.01% to be considered a sparse tensor.

FIG. 2D is a conceptual diagram that illustrates a sparse-dense node 250, according to an embodiment. Compared to the node 240 in FIG. 2C, node 250 has sparse weights that are illustrated by having much fewer connected lines. Despite being illustrated as a dense tensor, the input $y^{l-1}$ can be a dense tensor or a sparse tensor, depending on the previous node's sparsity. The weights of this node 240 are sparse, meaning there are a large number of inactive values (e.g., zeros) in the weight tensor. A sparse weight tensor may be achieved by imposing a constraint on node 240 to limit the maximum number of active values in the weight tensor. After the linear operation, the intermediate tensor $\hat{y}^l$ is likely to be dense because the linear operation, such as tensor multiplication or convolution, likely spreads the number of active values in the tensor. After the linear operation, the non-linear activation 226 step is the same as the node 240 in FIG. 2C. For example, the ReLU activation function will get around half of the values as zeros. Overall, the output tensor $y^l$ is still a dense tensor since about half of the values are dense. In this example, node 250 may be referred to as a weight-sparse and activation-dense node or simply sparse-dense node.

FIG. 2E is a conceptual diagram that illustrates a sparse-sparse node 260, according to an embodiment. Compared to node 250 in FIG. 2D, node 260 also has sparse weights, but it also a sparse activation function that generates a sparse output. The input $y^{l-1}$ can be a dense tensor or a sparse tensor, depending on the previous node's sparsity. In this example, the input $y^{l-1}$ is illustrated as a sparse tensor. Even though the weights of this node 260 are sparse, after the linear operation, the intermediate tensor $\hat{y}^l$ is likely to be dense because the linear operation likely spreads the number of non-zero values in the tensor. After the linear operation, a sparse activation function called K-winner activation is used instead of a dense activation such as ReLU activation function. K-winner activation selects the top K values in the intermediate tensor $\hat{y}^l$ and force all other values, non-zero or not, to zeros. K may be a constraint set to maintain the sparsity of node 260 and may be set as a percentage of the total number of values in a tensor. For example, K may be 30%, 20%, 15%, 10%, 5%, etc., depending on the selection. The output tensor $y^l$ is a sparse tensor after the K-winner activation function that restraints the number of active values in the tensor. In this example, node 260 may be referred to as a weight-sparse and activation-sparse node or simply sparse-sparse node.

Neural network 200 with one or more nodes that have the sparse-dense or sparse-sparse structure may be referred to as a sparse neural network. A sparse neural network may be a hierarchical temporal memory system. In various embodiments, while a sparse neural network may include a large number of sparse nodes, the sparse neural network may also include some dense nodes. Also, a sparse node may be a sparse-sparse node 260 or a sparse-dense node 250.

A sparse neural network often has improved performance in terms of speed in training and inference because the large number of inactive values in the network allows the network to skip many mathematical operations. For example, many common operations in neural networks, such as convolution and tensor multiplication, may be converted to dot products. Oftentimes a processor uses dot products to compute those operations in neural networks. Zeros in the tensors will significantly simplify the number of multiplications and additions needed to perform in a dot product. In many cases, sparse neural networks may model the structure of a human brain, which appears to also rely on a large degree of sparsity. Those sparse neural networks often not only have improved speed compared to dense neural networks but also increase inference accuracy particularly in the cases of noisy environments. For example, sparse neural networks reduce the number of parameters necessary to achieve an equivalent result accuracy, leading to savings in computational infrastructure, execution time, latency, power and therefore costs. They also exhibit increased robustness to noise in real-world situations. In Edge and IoT applications, a sparse network may fit on a limited deployment platform where an equivalent dense network would not.

Example Circuitry for AI Accelerator

Figure 3:
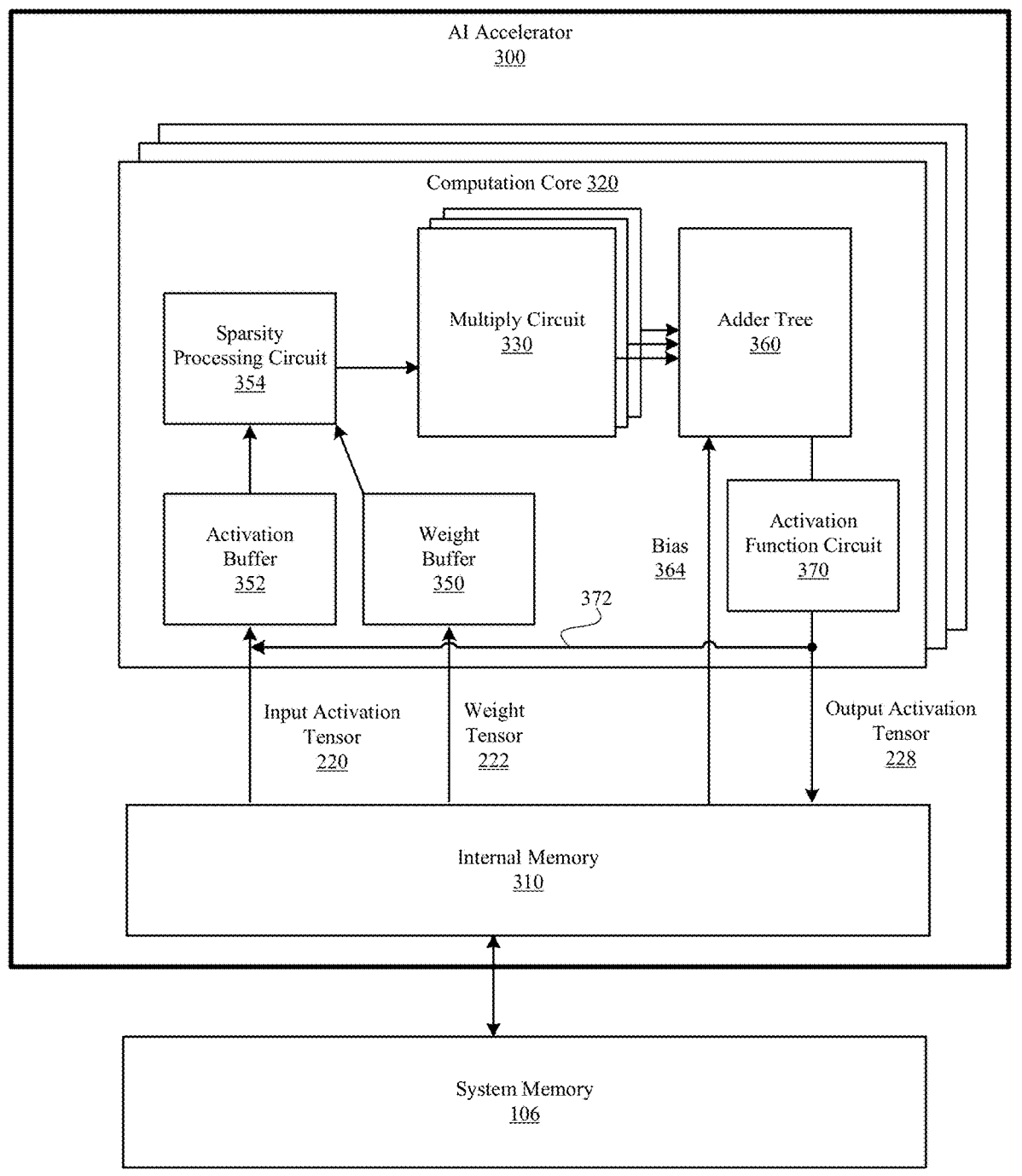
FIG. 3 is a block diagram illustrating circuitry and hardware architecture of an example AI accelerator, according to an embodiment.

FIG. 3 is a block diagram illustrating circuitry and hardware architecture of an example AI accelerator 300, according to an embodiment. AI accelerator 300 may be a circuit that is efficient at performing operations related to a sparse neural network. AI accelerator 300 may be an example of AI accelerator 104 or may also be embedded as part of a larger processor, such as CPU 102. In various embodiments, AI accelerator 300 may include fewer or additional components than the example shown in FIG. 3. For example, in one embodiment, AI accelerator 300 shown in FIG. 3 only illustrates blocks that are relevant to computations related to accelerating the operation of a sparse neural network and other components may not be shown. In one embodiment, AI accelerator 300 includes internal memory 310 and one or more computation cores 320 that perform computations in parallel.

Internal memory 310 may be the dedicated memory for AI accelerator 300 that is used for storage of data fetched from system memory 106 and data outputted by computation cores 320. The data stored in internal memory 310 may include input data of neural network 200, weights and other coefficients in neural network 200, intermediate data of neural network 200, such as output activation tensor 228 that is outputted by each node 210, loss function coefficients, and other suitable data that are related to the operation of neural network 200. For each node 210, input activation tensor 220 may be saved in internal memory 310. The input activation tensor 220 may be divided into multiple units and are sent to various computation cores 320 to process in parallel. The outputs of computation cores 320s may be recombined as output activation tensor 228, which is an output of a node 210. After the operations of the nodes 210 in a layer of neural network 200 are completed, operations of nodes 210 in the next layer may begin. The output activation tensor 228 is then fetched again to one or more computation core 320 as the input activation tensor 220 of a succeeding node 210 in the next layer. The process repeats until the operations reach the output layer 204. In some embodiments, the data stored in internal memory 310 may be sparse tensors that include zeros in various locations. In some embodiments, some data in internal memory 310 may also be compressed to dense tensors by removing zeros in the tensors. Compression of sparse tensors will be discussed in further detail.

In some embodiments, an AI accelerator 300 may not need to include internal memory 310. Instead, data are directly fetched and written to the system memory 106.

A computation core 320 is a circuit that includes a number of multiply circuits 330 that perform tensor operations such as the multiplications part of dot products, tensor multiplications, convolutions. Common machine learning operations such as tensor multiplications and convolutions may be converted to dot products and be performed by multiply circuits 330. A computation core 320 may include a number of multiply circuits for performing computations in parallel.

A multiply circuit 330 may take various forms. In one embodiment, a multiply circuit 330 is a multiply-accumulate circuit (MAC) that includes multiply units and accumulators. The multiply units may be used to perform multiplications and additions. A multiply unit is a circuit with a known structure and may be used for binary multiplication or floating-point multiplication. An accumulator is a memory circuit that receives and stores values from the multiply units. The values may be stored individually or added together in the accumulator.

Computation core 320 may include circuitry upstream of multiply circuits 330 for pre-processing of various tensors such as by dividing an input activation tensor into smaller units and by compressing and converting sparse tensors to a form that is efficient for the multiply circuits 330 to process. An activation buffer 352 is a buffer circuit and related data-processing circuit for performing data processing of an input activation tensor 220 for a node 210. For example, normally an input activation tensor 220 may have a size that is significantly larger than the capacity of a multiply circuit 330. The input activation tensor 220 may be divided into multiple data subunits and be processed in parallel by different multiply circuits 330. Activation buffer 352 may include circuitry that divides the input activation tensor 220 or include different addresses for various multiply circuits 330 to fetch different portions of the input activation tensor 220. In some embodiments, activation buffer 352 may fetch the tensor values from internal memory 310. In some cases, only the active values are fetched to activation buffer 352.

Activation buffer 352 may also perform a transpose operation of the input activation tensor 220 by fetching data values in the input activation tensor 220 in an order different from the order in internal memory 310. In some cases, an input activation tensor 220 may be saved in internal memory 310 under certain dimensions such as X by Y by Z while the division of data subunits may be more efficient under the dimension Y by Z by X. The efficiency of storage and operation of data under certain dimensions may depend on the hardware landscape such as the multiplier arrangement in a multiply circuit 330 and memory structure.

A weight buffer 350 and sparsity processing circuit 354 are other examples of circuitry upstream of multiply circuits 330 for pre-processing of various tensors. For an operation with respect to a given node 210 in neural network 200, weight buffer 350 fetches the tensor values of weight tensor 222 from internal memory 310 or system memory 106. Similar to activation buffer 352, in some cases weight buffer 350 may only fetch the active values in weight tensor 222.

Sparsity processing circuit 354 may include different types of circuits that are used to pre-process weight tensor 222 and input activation tensor 220. Weight tensor 222 and input activation tensor 220 may be associated with different degrees of sparsity. For example, in one case, weight tensor 222 may be sparse while input activation tensor 220 may be dense. In another case, both weight tensor 222 and input activation tensor 220 are sparse. Sparsity processing circuit 354 may pre-process weight tensor 222 and input activation tensor 220 in different ways, depending on their sparsity. For example, in some embodiments, weight tensor 222 and input activation tensor 220 may be processed separately. In some embodiments, when both weight tensor 222 and input activation tensor 220 are sparse, sparsity processing circuit 354 may process the two tensors together. Various example structures of sparsity processing circuit 354 and sparsity processing approaches are discussed later in this disclosure in association with FIG. 6 through FIG. 10.

The pre-processing in sparsity processing circuit 354 may include identifying locations of active values in the weight tensor 222 and input activation tensor 220. Sparsity processing circuit 354 may scan through a sparse tensor and identify the locations of the active values in the sparse tensor. The locations may take the form of the locations in the tensor (e.g., a location at the third row and the fifth column in the tensor) and may also take the form of memory addresses of active values (e.g., an active value being saved in the memory address of 0xC0010000). Sparsity processing circuit 354 may only transmit the active values to multiply circuits 330 for computations. In some embodiments, sparsity processing circuit 354 may identify dense pairs that have active values at the same tensor location in both weight tensor 222 and input activation tensor 220. Sparsity processing circuit 354 may only transmit the dense pairs to multiply circuits 330 for computations. In other words, in some cases, sparsity processing circuit 354 may exclude the transmission of inactive values in weight tensor 222 or input activation tensor 220 to multiply circuits 330.

The pre-processing in sparsity processing circuit 354 may also include compressing a sparse tensor to a dense tensor.

In various computations such as dot products and other multiplications, the results will be zero if one of the input values is zero. As such, the processing of those inactive values may be skipped in the multiply circuits 330. In some cases, when two tensors are multiplied, only multiplications of two active values are to be computed. As such, in some embodiments, sparsity processing circuit 354 may compress a sparse tensor by converting the sparse tensor into a dense tensor. The number of multiplication operations to be performed by multiply circuits 330 may be significantly reduced after inactive values are removed from the tensors. By way of example, if a dot product is performed between two sparse tensors that each has about 10% of active values, it is expected to only 1% of the multiplication operations will need to be performed. The rest of the positions are either the multiplications of two zeros or multiplications of a non-zero value and a zero. By removing the inactive value (e.g., zeros) in the tensors, sparsity processing circuit 354 may speed up the computations for multiply circuits 330. In some embodiments, the tensors fetched to sparsity processing circuit 354 may also be structured so that sparsity processing circuit 354 can remove the zeros in those tensors more efficiently. The structure of tensors will be further discussed in FIG. 4A. In some embodiments, sparsity processing circuit 354 may also store the addresses of active values in the tensors so that the compressed tensors and output tensors generated by multiply circuits 330 may be expanded back to sparse tensors.

Sparsity processing circuit 354 may also perform other data pre-processing such as transposing weight tensor 222 and input activation tensor 220. Sparsity processing circuit 354 may also divide the tensors in a way that is efficient for multiply circuits 330 to process. The pre-processed tensors are fetched and sent to multiply circuits 330 to perform computations with input activation tensor 220.

After results of multiply circuits 330 are computed, the results are sent to an adder tree 360 to generate an intermediate output tensor $\hat{y}^l$. In some embodiments, input activation tensor 220 is divided into multiple subunits for parallel processing in the multiply circuits 330. The results of the multiply circuits 330 are then combined in adder tree 360. For example, in performing a dot product, multiply circuits 330 perform the multiplication and accumulation parts of the dot product and the results of different multiply circuits 330 are added together at the adder tree 360 to generate the final result. Alternatively, the accumulation parts may be performed in the adder tree, depending on the hardware architecture and the operations. In some cases, a bias factor 364 may also be fetched from internal memory 310. The bias factor 364 may be added to each value in the output of the adder tree 360.

An activation function circuit 370 is a circuit downstream of adder tree 360 to perform the operation specified in the activation function. Activation function circuit 370 includes a number of comparator circuits that are used for the ReLU activation function. Activation function circuit 370 may also include comparator trees for determining top K highest values in a tensor in the case of a sparse K-winner activation function. Activation function circuit 370 generates the output activation tensor 228 from the intermediate output tensor. Activation function circuit 370 may set a number of values in the intermediate output tensor to zero, depending on the type of activation function. Hence, output activation tensor 228 may be a dense or sparse tensor. In some embodiments, one or more input tensors are previously compressed, activation function circuit 370 may also expand the output activation tensor 228 back to the original size.

Output activation tensor 228 is transmitted to internal memory 310 or system memory 106 as the output of a particular node 210. Output activation tensor 228 may also directly be fed back to activation buffer 352 as the input of the next cycle, as indicated by arrow 372. The output activation tensor 228 is fetched subsequently as input activation tensor 220 when another round of operations related to a subsequent node 210 begins.

The use of a sparse neural network and an AI accelerator that is efficient at operating with the sparse neural network reduces the number of computations and power consumptions of the AI accelerator. The sparse neural network also reduces storage requirements and working memory bandwidth. The AI accelerator improves the speed of a computing device and is suitable for use in computing devices that have limited power or computing capacity, such as IoT devices and in the case of edge computing.

Example Structured Sparse Tensor Configurations

Figure 4A:
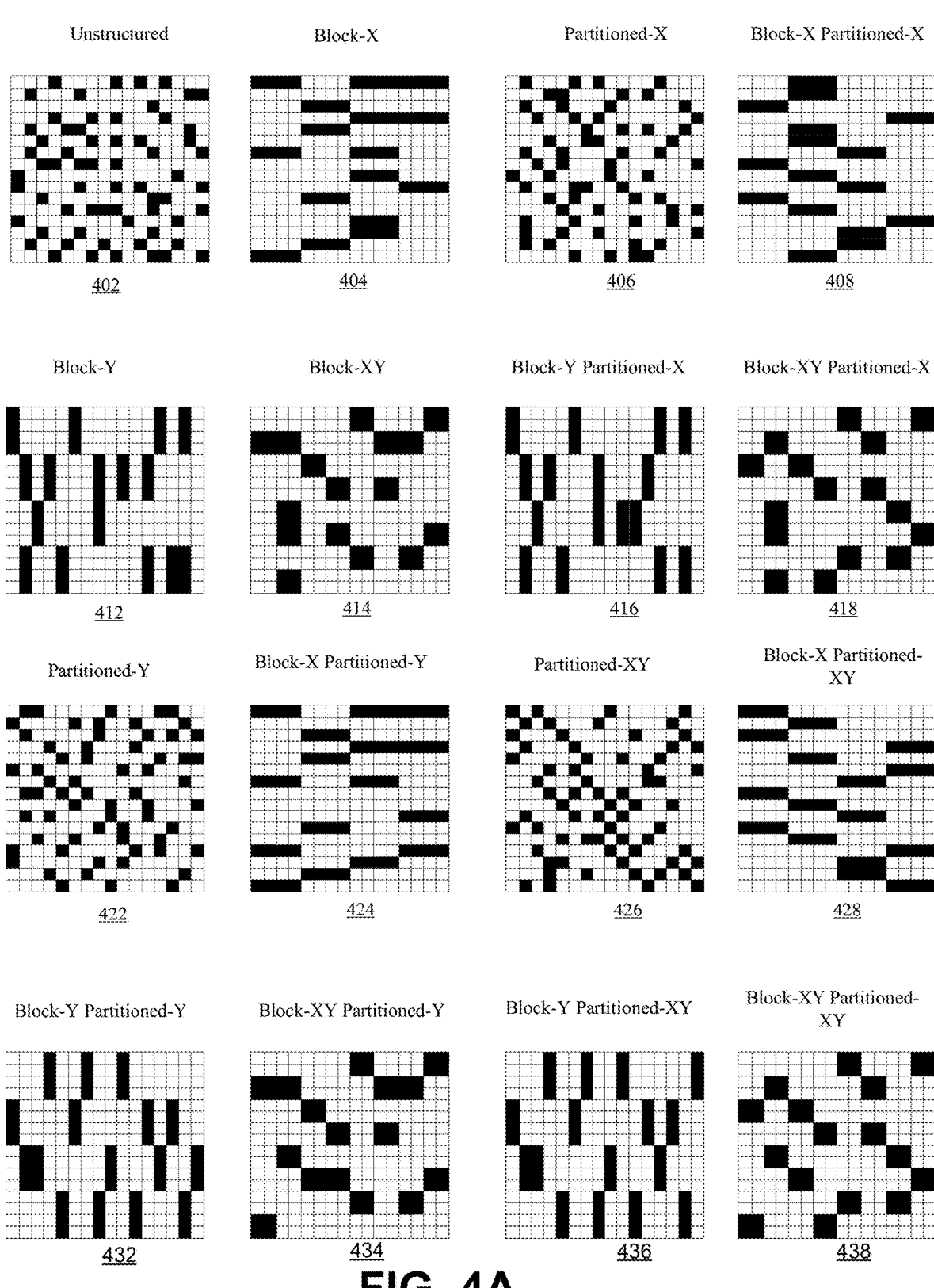
FIG. 4A is a conceptual diagram illustrating various examples of sparse tensors, according to an embodiment.

FIG. 4A is a conceptual diagram illustrating various examples of sparse tensors, according to an embodiment. Structured sparse tensors may be used as the data format of a sparse neural network. Such a format is efficient for an AI accelerator 300 to perform computations. For example, a properly structured tensor with active values arranged in a certain structured manner may allow sparsity processing circuit 354 to process and compress the tensor in an efficient manner, thereby further speeding up the neural network.

Tensor 402 is an example unstructured tensor. Tensor 402 and various tensors in FIG. 4A are illustrated as 2-dimensional tensors with an x-direction (row) and a y-direction (column). In actual data, the tensors used in neural network 200 may include in any number of dimensions, from one to many. The discussions using 2-dimensional tensors may be extended to any number of dimensions. Whether a tensor is structured depends on whether the active values are distributed in any specific manner according to one or more constraints. According to an embodiment, the manners to arrange the active values may be referred to as block and partition. Each of those manners will be discussed in further detail in association with tensor 404 through tensor 438. In FIG. 4A, the active values (e.g., non-zero values) are represented by the shaded cells and the inactive values (e.g., zeros) are represented by the white blocks. In unstructured tensor 402, the active values are distributed randomly. For example, in the x-direction, the first row of tensor 402 has 4 active values; the second row of tensor 402 has 4 active values; and the third row of tensor 402 has only 1 active value. The active values in unstructured tensor 402 are generated based on the training of neural network 200 without any constraints imposed on how the active values should be placed.

The use of unstructured tensors in an AI accelerator 300 may significantly slow down the speed of operation due to the sparse marshalling problem in identifying the randomly located active values. As mentioned in FIG. 3, to speed up a sparse neural network, a sparse tensor may be compressed to a dense tensor so that the computations related to value locations that are zero are skipped. However, in an unstructured tensor 402 that has active values occurring without an easily identifiable pattern, an AI accelerator may need to spend significant resources and time to scan through the tensor to identify the locations of active values. The time for scanning through the tensor may sometimes even be longer than performing the tensor multiplication in a brute-force manner such as by performing multiplications of two sparse tensors on all data locations of the tensors without identifying the sparse locations.

The marshalling problem may be illustrated by an example. The expected number of multiply-accumulate operations for a sparse-sparse (both tensors are sparse) dot product is the product of the tensors' densities. In a 1600-element dot product, if the first tensor's density is 5% and the second tensor's density is 12.5%, the expected number of the multiply-accumulate operations between two active values is only 10. This represents 160 times of computation reduction. To realize this computation reduction, the sparse tensors may be distilled by sparsity processing circuit 354 to eliminate the operand pairs that have an inactive value involved and keep only the mutually active operand pairs from each sparse tensor. This distillation process may be referred to as a sparse to dense compression. However, without specific structured tensors and circuitry, rendez-vousing these mutually active pairs can be a challenging problem. Also, in an unstructured tensor, the positions of active values within a tensor usually do not follow an algorithmic pattern. During compression from a sparse tensor to a dense tensor, coordinates will need to be associated with the active values. There will be storage and performance overhead in an AI accelerator for accessing these coordinates. General hardware circuitry, whether conventional CPU, GPU, FPGA, or ASIC, may take a significant time to compare both tensors to determine the locations with active values in both tensors. The time or the hardware footprint needed to perform the searching may rival a dense operation that conducts the dot products in all 1600 locations by vector processing with single instruction multiple data (SIMD) units. The searching of those locations may be referred to as the marshalling problem.

According to an embodiment, the sparsity of tensors in a neural network 200 may be constrained so that the active values are spatially structured. For example, structured tensors may be achieved in the training of neural network 200 by imposing one or more constraints on how the active values are distributed. The tensors 404 through 438 illustrate two types of structure, which are referred to as block structure and partitioned structure. A tensor may also be in a combination of these two types of structures. In a block structure, a tensor may be divided into blocks, which are a group of data value locations in the tensor. In the block structure, the active values are concentrated in a subset of blocks, leaving the rest of the blocks completely inactive. In a partitioned structure, the tensor may be divided into sub-volumes. One or more constraints may be imposed equally on each sub-volume. For example, the number of active values in each sub-volume may be a fixed number so that the partitions have a balanced number of active values. The partitioned structure results in less variability of the sparsity, which in turn reduces the combinatorics of the marshalling problem. The constraints of blocks and partitions may be imposed on one or more dimensions of the tensor. A tensor may also have both the block and partitioned structures in one or more dimensions.

Tensors 404 through 438 illustrate various examples of structures in different dimensions, according to different embodiments. In tensor 404, the tensor is divided into blocks in x-dimension. Each block includes 1×4 value locations. Each block is either active or inactive. In an active block, at least one of the values is active. In an inactive block, all of the values are inactive. In tensor 406, the tensor is divided into partitions in x-dimension. Each row is a partition. A constraint is imposed on tensor 404 so that each partition (each partition) has the same number (4) of active values. In tensor 408, both block structure and petitioned structure are imposed in x-dimension. Similar to tensor 404, tensor 408 is divided into 1×4 blocks. Each row in tensor 408 has one and only one active block, which is a condition imposed by the partition.

Tensor 412 through 438 illustrate additional structures that are in different dimensions and different combinations. For example, tensor 412 is a block structure in y-dimension. Tensor 414 is a block structure in both x and y dimensions. Each block includes 2×2 value locations. In tensor 416, block structure is imposed in y-dimension while the partition structure is imposed in x-dimension. As such, each row (x-dimension) has four dense vertical blocks. Tensor 418 is divided by 2×2 x-y blocks. Partitioning is imposed in x-dimension so that each row in tensor 418 has 2 blocks. Tensors 422, 424, 426, 428, 432, 434, and 436 are additional examples of different combinations of block and partitioned structures. Tensor 438 is divided by 2×2 x-y blocks. Partitioning is imposed in both x-dimension and y-dimension so that each row in tensor 438 has 2 blocks. Each column in tensor 438 also has 2 blocks.

Figure 4B:
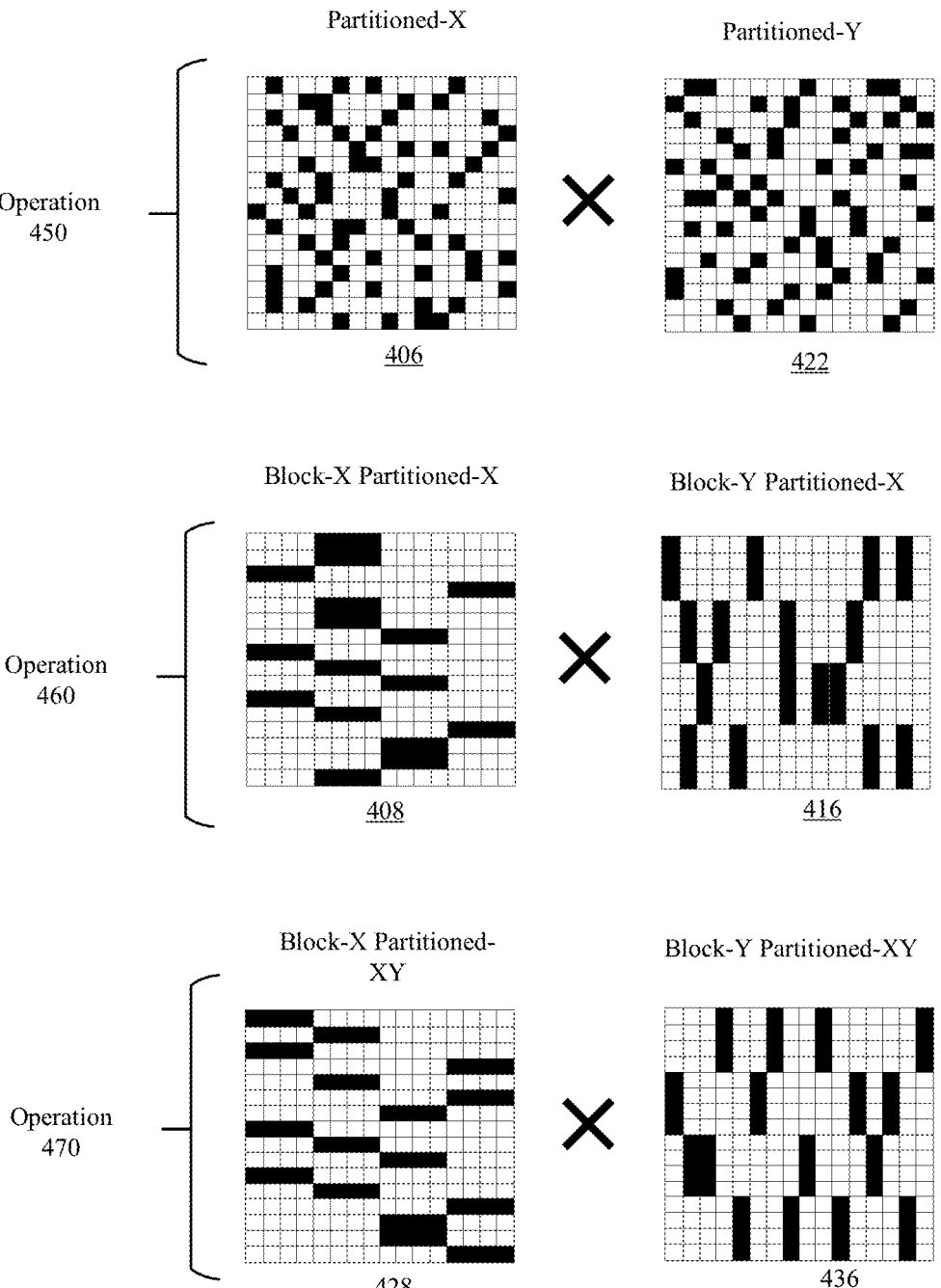
FIG. 4B illustrates several examples of pairings of sparse tensors, according to an embodiment.

The block and partitioned structures can be applied to both input activation tensor 220 and weight tensor 222. Each of the input activation tensor 220 and weight tensor 222 may be blocked and partitioned in a similar manner but in different dimensions so that the pairing of input activation tensor 220 and weight tensor 222 can predictably limit the number of computations. FIG. 4B illustrates several examples of such pairing of tensors. In operation 450, partitioned-x tensor 406 may represent the weight tensor 222 and partitioned-y tensor 422 may represent the input activation tensor 220. The tensor 406 and tensor 422 both have a partitioned structure but the former has the partitions in a first dimension and the latter has the partitions in a second dimension different from the first dimension. Rows of tensor 406 and columns of tensor 422 have a fixed number of elements. Hence, operation 450 can have a maximum of 4 multiply-accumulate operations per dot-product.

In operation 460, block-x and partitioned-x tensor 408 may represent the weight tensor 222 and block-y and partitioned-y tensor 416 may represent the input activation tensor 220. The tensor 408 and tensor 416 both have block structure and partitioned structure, but both blocks are partitions in different dimensions. In this case, rows of tensor 408 and columns of tensor 416 have a fixed number of blocks. Hence, operation 460 can have the maximum of 1 single instruction multiple data (SIMD) block multiply-accumulate operations per dot-product.

In operation 470, block-x and partitioned-xy tensor 428 may represent the weight tensor 222 and block-y and partitioned-xy tensor 436 may represent the input activation tensor 220. The tensor 428 and tensor 436 both have block structure and partitioned structure, but the blocks are divided in different dimensions. In this case, both rows and columns of tensor 428 and the row and columns of tensor 436 have a fixed number of blocks. Hence, operation 470 can have the maximum of 1 single instruction multiple data (SIMD) block multiply-accumulate operations per dot-product.

FIG. 5 is a flowchart depicting an example process for performing operations related to a sparse neural network, according to an embodiment. The process may be performed by a computing device, such as computing device 100. The computing device may be equipped with an AI accelerator 300 and may perform one or more steps of this process using the AI accelerator 300. However, in some embodiments, the process may also be performed using a CPU. The process may be embodied as software algorithm that may be stored as computer instructions that are executable by a processor.

The instructions, when executed by the processor, cause the processor to perform various steps described in FIG. 5.

The computing device initiates 510 a neural network with a plurality of nodes. The structure of the neural network may depend on its type, which can be CNN, RNN, LSTM, etc. The structures and operations of the nodes can be different among the nodes. For one or more nodes, each may be associated with a weight tensor and an activation tensor. The structure and operation related to the tensors are discussed in FIGS. 2A and 2B. The neural network initiated may be saved in system memory 108 or storage unit 110. The weight tensor in each node may include a plurality of data values. The initial data values may be initiated randomly or based on expected values. In some cases, the initial data values in the weight tensor may be initiated with a number of zeros.

The computing device imposes 520 one or more structural constraints to limit the distribution of active values of the weight tensor. The constraints may be based on one or more code instructions in training the neural network that defines the configuration of the neural network. The structure can be blocky or partitioned or both. The blocks and partitions may also be assigned in any dimensions, as discussed in FIG. 4A. A structural constraint may be node specific or be applied across a set of nodes. For example, each node can have the same constraints, different constraints, or no constraints. The structural constraint restricts the distribution of active values in the weight tensor and also the number of active values in the tensor. Hence, if a node is imposed with a structural constraint, the node is also a sparse node that has a small number of active values.

For a node, a structural constraint may also be imposed for activation tensors by way of the K-winner activation function. For the nodes in the input layer 202, the input activation tensor 220 may likely be a dense tensor because the input data is often data such as image data, speech data, etc. As such, a node in the input layer may be a sparse-weight, dense-activation node, or simply sparse-dense node. After weight tensor 222 and a K-winner activation function is applied, the output activation tensor 228 can be sparse. For example, the K-winner activation function can limit the number of active values in the output activation tensor 228 and force the loser data values to zeros. The output activation tensor 228 becomes in the input activation tensor 220 of the next node. The next node can be a sparse-sparse node. The K-winner activation function may take the form of training the neural network that defines the configuration of the neural network.

While K-winner activation function is described as an example of a sparse activation function, other sparse activation functions may also be used in various embodiments. A sparse activation function is an activation function that results in a sparse output when the activation function is applied to the computation result in a neural network node. For example, in K-winner activation function, the number of active values in the output may be limited by K.

Alternatively, or additionally, other techniques may also be used to increase the activation sparsity (e.g., from 50% sparsity to 75% sparsity). For example, a threshold approach may be used in a sparse activation function. Values that are below (or above) the threshold are set to inactive (e.g., set to zeros). The threshold may be global or local, static or dynamic. The threshold is applied to an entire tensor in the global approach while the threshold is only applied to a certain subset of data (e.g., a block or a partition) in a local approach. In a static approach, a predetermined threshold value may be used. In a dynamic approach, a threshold value may vary based on factors to be determined during the training. For example, statistics may be performed on a set of values on the fly to determine a dynamic threshold cutoff to set some of the values to zeros. By way of example, in one embodiment the sparse activation process uses RELU with a threshold. The threshold may be established during model training and hyperparameter search. The threshold does not provide a fixed number of K non-zero values being passed onto the next layer, but a variable number of values that empirically is bounded to some range. In some cases, the hardware to implement may be simpler than K-winners. The threshold in some cases needs to be set to a higher value (fewer non-zeros get through) in order to provide an upper bound on the number of non-zero values let through. In some embodiments, the number of values that are let through in the activation may be counted. When the number exceeds a given amount, all remaining values are zeroed. However, a strong value may be excluded simply because the count has been exceeded. Such exclusion may also be order dependent, with earlier index weaker values being passed through at the potential expense of later index stronger values.

The structure constraint, similar to the weight tensor, can be blocked or partitioned. In blocky K-winner, for a given output activation tensor, a processor of the computing device may divide the tensor into blocks. For each block, the processor may perform statistics on an aggregation of the blocks, such as by taking the maximum, the minimum, the sum of the values in each block. The top K winning blocks will be selected as the dense blocks. The values in the rest of the blocks will be forced to zero. In partitioned K-winner, for a given output activation tensor, the processor may divide the output activation tensor into partitions. For each partition, the processor may select a fixed number of highest values in the partition as the winners. In this context, if K-winner is applied to an entire tensor, the K-winner approach may be referred to as a global K-winner. If K-winner is applied to a subset of the tensor, such as a dimension, a block, or a partition of the data, the K-winner approach may be referred to as local K-winner.

The computing device may train 530 the neural network using the structural constraints. The computing device may use one or more processors, such as an AI accelerator 300, a CPU, or in combination, to perform different computations associated with training of the neural network. The training 530 may include forward propagation 540 and backpropagation 550. In forward propagation 540, the processor performs computations as defined by each node in the forward direction as illustrated in FIG. 2A. In one or more nodes, the computation may include a linear operation between an input activation tensor 220 and a weight tensor 222 followed by a non-linear operation, as illustrated in FIG. 2B. In backpropagation 550, the processors may adjust the weight values in the weight tensors using techniques such as coordinate descent and also based on the structural constraints imposed on one or more nodes.

In forward propagation 540, different operations may be performed based on the sparsity of a node. The operations may include pre-processing, multiply-accumulation, and post-processing of tensors. According to an embodiment, in a sparse-dense node, a processor may, as part of a pre-processing, transpose 542 a sparse weight tensor based on the structure of the weight tensor. In one embodiment, the transpose may align the partitions in a structured tensor with the lanes in a computation core 320 that are used to transmit data to multiply circuits 330. For example, a computation core 320 of a processor may include 64 multiply circuits 330 and N lanes for transmitting values to the multiply circuits 330. The weight tensor may be divided into N partitions and be transposed to align the partitions with the lanes.

Alternatively, or additionally, the processor may compress 544 to convert the sparse weight tensor into a dense weight tensor by removing zeros in the sparse weight tensor as part of the pre-processing. The processor may record the location addresses of the active values or the dense blocks (in the case of block structure). Since the sparse weight tensor is structured, the identification of the active value locations is significantly reduced. If the weight tensor is partitioned, the numbers of active values or dense blocks may be the same or similar in each partition. As such, the computation with respect to each partition is expected to be completed with the same number of cycles or a similar number of cycles, thereby improving the throughput and efficiency of the processor.

The processor may perform 546 multiply-accumulate operations between the compressed weight tensor and input activation tensor. The multiply-accumulate operations may be performed in parallel by a number of multiply circuits 330 in parallel. The computation results of the multiply circuits 330 are aggregated in an adder tree 360. The processor may also apply 548 an activation function to the output of the adder tree 360. The activation function may be a dense activation function such as ReLU or tan h. The activation function may also be a sparse activation function such as K-winner. The activation function may further be a sparse and structured activation function such as blocky K-winner or partitioned K-winner. After completing the computations of a node, the processor may perform computations on a subsequent node in the forward direction of the neural network until an inference result is made. The inference result is compared to the actual label of a training sample.

In backpropagation 550, the processor may adjust 552 the weight values in weight tensors of the node under the structural constraints. For example, the weight values may be adjusted using techniques such as coordinate descent to change the values in directions that will more likely for the neural network to generate the correct inference result. In adjusting the weight values, only certain locations of the values are allowed to be non-zero and the active values are distributed according to the structural constraints.

After the neural network is trained with training samples, the neural network may be used to make inferences of actual samples. The inference may be performed using the forward propagation 550. The inference is also accelerated because the trained weight tensors are structured. The process used may also have hardware architecture that is efficient in processing those structured weight tensors.

Example Sparse-Sparse Node Implementation

FIG. 6 is a flowchart depicting an example process for performing operations related to a sparse-sparse node in a neural network, according to an embodiment. The process may be performed by a computing device, such as computing device 100. The computing device may be equipped with an AI accelerator 300 and may perform one or more steps of this process using the AI accelerator 300. However, in some embodiments, the process may also be performed using a CPU. The process may be embodied as software algorithm that may be stored as computer instructions that are executable by a processor. The instructions, when executed by the processor, cause the processor to perform various steps described in FIG. 6. The process illustrated in FIG. 6 may be an example of subprocess of the process discussed in FIG. 5.

A processor performs the operation related to a sparse-sparse node that is associated with a sparse weight tensor and a sparse input activation tensor. For example, the sparse activation tensor may be generated by a sparse activation process that will be discussed in further detail in FIG. 9 through FIG. 13. The processor generates 610 a first bit vector for the sparse weight tensor and a second bit vector for the input activation tensor. A bit vector is a string of bits that encode the locations of active values in a tensor. A bit vector may have a first value (e.g., 1) that represents the dense byte value in a tensor and a second value (e.g., 0) that represents the inactive value in the tensor. For example, if a tensor has 1600 bytes, each byte representing a value, the bit vector will be a string of 1600 bits with is corresponding to the locations where active values are identified.

The processor performs 620 a bitwise AND operation between the first bit vector and the second bit vector to generate a sparse operand bit vector. The sparse operand bit vector is the product of the first and second bit vectors. In a linear operation that can be computed using a dot product, only the active values generated in the output will be at the locations where the weight tensor and the activation tensor both have active values. The bitwise AND operation only keeps the value 1 in those locations and will turn locations that have a zero in either bit vector into zero. Hence, the sparse operand bit vector represents the locations where both the weight tensor and the activation tensor have active values.

The processor generates 630 weight addresses and activation addresses with active values based on the sparse operand bit vector. Each weight address and activation address are memory addresses of the data values that are stored in a memory location. The memory may be the system memory 106, internal memory 310, activation data buffer 352 or weight buffer 350. Each weight address has a corresponding activation address whose data is in the same corresponding position in the weight tensor and the activation tensor.

The weight tensor and the activation tensor can be compressed or uncompressed in this process. For example, if data values are directly fetched from system memory 106 or internal memory 310, the tensors may be uncompressed. The tensors that have been compressed (e.g., removing zeros) by sparsity processing circuit 354 may also be used. If the weight tensor and activation tensor are stored in memory uncompressed, the 1-bit positions in the sparse operand bit vector correspond to the active value addresses for the weight tensor and activation tensor pairs. If the weight tensor and activation tensor are compacted to remove zero values, the counts of the 1-bits in the weight and activation bit vectors, up to but not including the location of the 1-bit positions in the sparse operand bit vector correspond to the weight tensor's and activation tensor's active value address. The generation of weights and activation value addresses in their respective compacted memories from the bit vectors may be performed by one or more gating networks.

The processor fetches 640 the active values from the weight tensor and the activation tensor based on the weight addresses and activation addresses. The processor transmits 650 the fetched active values to multiply circuits 330 to perform multiply-accumulate operations. Since only data corresponding to locations where both tensors have active values are transmitted to multiply circuits 330, the number of multiply-accumulate operations is significantly reduced.

Figures 7, 8:
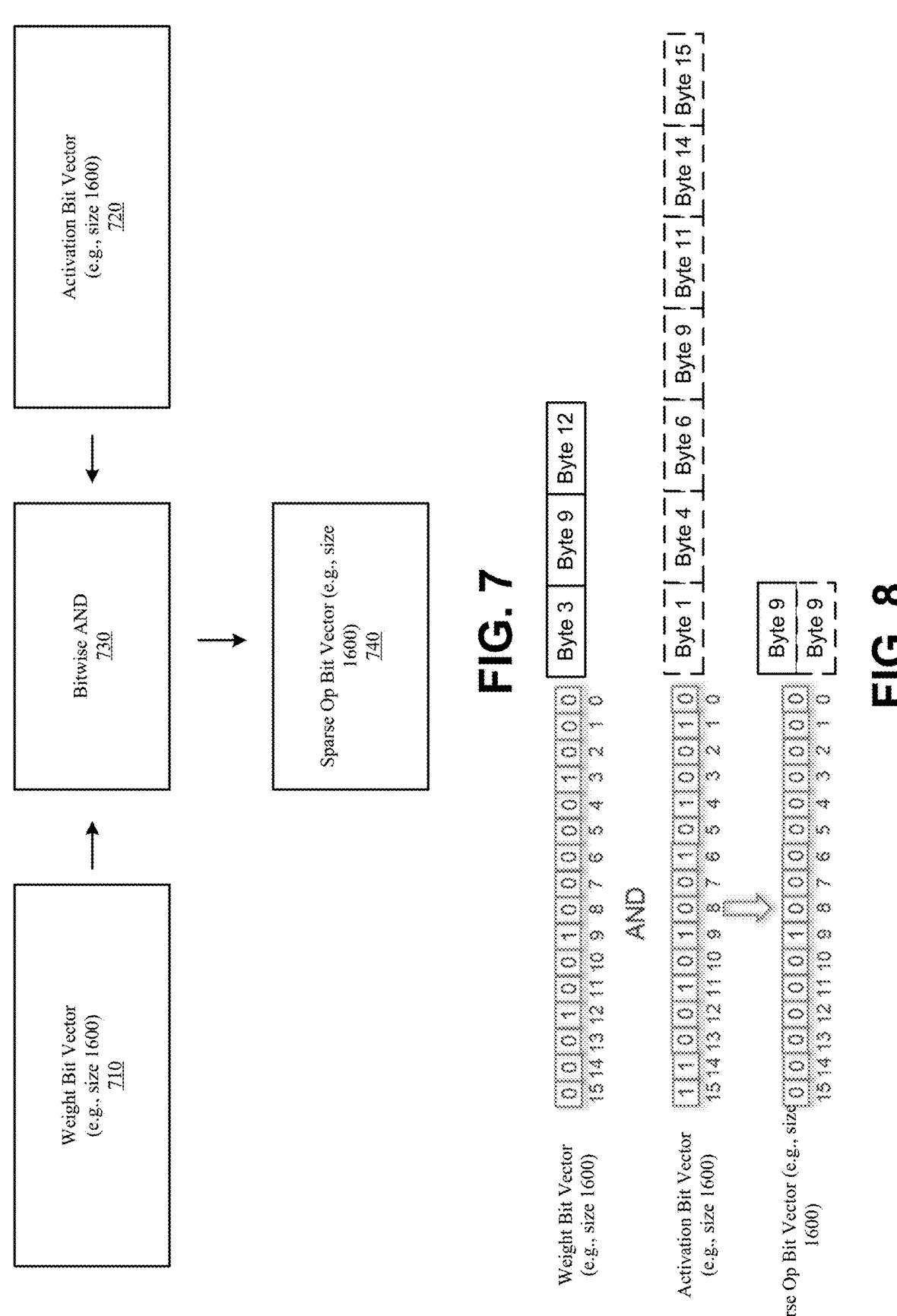
FIG. 7 is a block diagram illustrating the generation of a sparse operand bit vector, according to an embodiment.
FIG. 8 is a conceptual diagram illustrating the generation of a sparse operand bit vector, according to an embodiment.

FIG. 7 is a block diagram illustrating the generation of a sparse operand bit vector, according to an embodiment. FIG. 8 is a conceptual diagram illustrating the generation of a sparse operand bit vector. FIG. 7 shows that the sparse operand bit vector is generated by a bitwise AND operation between a weight bit vector and an activation bit vector. The AND operation may simply be achieved in hardware by passing the bits in the two bit vectors through an AND gate. FIG. 8 shows an example of a weight bit vector and an example of an activation bit vector. Position values from the weight bit vector are illustrated in solid-lined boxes and position values from the activation bit vector are illustrated in dash-lined boxes. In the weight bit vector, only positions 3, 7 and 12 are dense. In the activation bit vector, only positions 1, 4, 6, 7, 11, 14, and 15 are dense. By using the bitwise AND operation, the sparse operand bit vector has only one value of 1 at the 7th position.

Example Sparse Activation Process

FIG. 9 is a flowchart depicting an example process for performing operations related to a sparse neural network, according to an embodiment. The process may be performed by a computing device, such as the computing device 100. The computing device may be equipped with an AI accelerator 300 and may perform one or more steps of this process using the AI accelerator 300. While the steps in FIG. 9 are going to be discussed with using the components in the AI accelerator 300, in some embodiments, some or all of the steps in FIG. 9 may also be performed using another processor such as a CPU. The process in FIG. 9 illustrates how an AI accelerator 300 may impose a certain degree of sparsity to an output activation tensor 228 of a node 210 in the sparse neural network. The sparsity introduction process may be performed on one or more nodes 210, but does not necessarily need to be performed on every node of the neural network.

The AI accelerator 300 stores 910, at a memory circuit, a weight tensor 222 and an input activation tensor 220 that corresponds to a node 210 of a neural network. The memory circuit may be the system memory 106, the internal memory 310, the activation buffer 352, or the weight buffer 350, depending on the embodiment and how intermediate values are stored in the AI accelerator 300. The weight tensor 222 and the input activation tensor 220 in a particular node 210 may be sparse or dense, depending on the configuration of the node 210 and the output of the previous node. For example, the density of the input activation tensor 220 of a particular node 210 may depending on the density of the output activation tensor 228 of a previous node.

The AI accelerator 300 performs 920, by the multiply circuit 330, a computation between the weight tensor 222 and the input activation tensor 220 to generate an output activation tensor 228. The computation may be a linear operation such as a convolution, a convolution that is converted to a dot product, a dot product, an addition, and a multiplication. In various embodiments, the multiply circuit 330 may take different forms. For example, if both the weight tensor 222 and the input activation tensor 220 are sparse, the multiply circuit 330 may have one of the structures that are discussed in FIG. 6 through FIG. 8. If the input activation tensor 220 is dense, the multiply circuit 330 may have a structure that is discussed in U.S. patent application Ser. No. 17/332,181, filed on May 27, 2021, entitled "Hardware Architecture for Processing Data Sparse Neural Network," which is incorporated by reference herein in its entirety.

A comparator circuit of the AI accelerator 300 receives the output activation tensor 228. The comparator circuit may be an example of the activation function circuit 370, which is a hardware component that is efficient at imposing one or more activation constraints to the output activation tensor

228. The output activation tensor 228 at this stage may correspond to $\hat{y}^l$ illustrated in Equation 1, which is the intermediate output shown in FIG. 2E. Regardless of whether the weight tensor 222 and the input activation tensor 220 are dense or sparse, the computation in multiply circuit 330 could result in an intermediate output $\hat{y}^l$ that is dense. For example, convolution or matrix multiplication often increases the number of non-zero values in a tensor.

The comparator circuit, in turn, introduces sparsity to the output activation tensor 228 by reducing 940 the number of active values in the output activation tensor 228. The process of reducing the number of active values may be referred to as a sparse activation. The process select one or more values and maintain those selected values. The unselected active values are set to zero. The output activation tensor 228 usually maintains the same size and dimension after the sparse activation but contain more inactive values (becomes more sparse) compared to the original activation tensor 228. Various ways can be used to introduce sparsity to the output activation tensor 228. In some embodiments, the comparator circuit may use a threshold approach, in which each value in the output activation tensor 228 is compared to a threshold value. If the value is smaller than the threshold value, the value is set to zero so that the number of active values is decreased. The threshold value may be a predetermined value or a dynamically determined value that is based on a constraint of the maximum number of active values that should remain after applying the sparse activation. How the threshold value is determined may be different for each node.

In some embodiments, the comparator circuit may use a K-winner approach, which restricts the maximum number of active values to K after applying the sparse activation. The K-winner approach keeps the K largest values in a set of values as active and forces the remaining values to zero. The set of values here could be the entire dataset of the output activation tensor 228 or a subset such as a block or a partition as discussed in FIG. 4A. In a global K-winner approach, the comparator circuit may reduce the number of active values in the output activation tensor 228 globally by selecting a limited number of active values in the entirety of the output activation tensor 228. For example, the comparator circuit analyzes the entire dataset of the output activation tensor 228, keeps the K largest values in the output activation tensor 228, and forces the remaining values to zero.

In a local K-winner approach, multiple sparse activations may be conducted for an output activation tensor 228 and each sparse activation selects K winners in a specific subset of the output activation tensor 228. The comparator circuit divides the output activation tensor 228 into a plurality of subsets and selects, for each subset, a limited number of active values. The subsets may be the dimensions, partitions, or blocks of the entire output activation tensor 228. For example, in one embodiment, a local K-winner approach is applied to each channel dimension of the output activation tensor 228. The channel dimensions in a node 210 of a neural network may correspond to the feature dimensions, with each dimension correspond to a different feature. The local K-winner approach may be applied to each feature so that the output corresponding to each feature has a similar degree of sparsity but has a different distribution of active values in the output tensor. For example, in one case, the output activation tensor 228 is divided based on kernels corresponding to the node 210 of the neural network. Each subset corresponds a result of the computation with a kernel.

In various embodiments, different K-winner approaches may be applied to various nodes 210 in a neural network.

The numbers of active values may be different among the nodes 210. In some embodiments, the constraints of the numbers of active values may be predefined by the designer of the neural network, such as a data scientist. In some embodiments, the numbers of active values may be dynamically determined based on the efficiency, speed, power consumption, and performance of the neural network.

In performing a K-winner approach, one or more hardware processes that are efficient at completing the comparisons may be used. In a sorted data stream approach, the comparator circuit may receive a stream of values in the output activation tensor 228. The comparator circuit sorts the stream of values, which may be referred to as a sorted number of values. The sorted number of values may correspond to only a small subset of the total number of values in the set. For example, the number of values in the sorted values may correspond to K. When a new value is received at the comparator circuit, the new value is sorted with the existing sorted values and the lowest value, which is not selected in the sorted values, is discarded. The discarded value could be the new value or the currently lowest value in the sorted values. The memory addresses of the sorted values are maintained by the comparator circuit. As new values continue to arrive in the data stream, the comparator circuit again sorts the values and discards the values that are the smallest. After the entire stream of values is compared, the comparative circuit fetches the sorted values based on the memory addresses of those values and the remaining locations in the set are set to zeros. If the output values do not need to be in a sorted order, the comparator circuit may start to output after N–K values have arrived, thereby improving the latency of the process. N is the total number of values in the set of data and is usually known in advance.

In an unsorted comparison approach, the comparator circuit may store all of the N values locally in a buffer array without sorting the values. The comparator circuit may find the K largest values in the set and set the remaining values that are not selected to zero. In some embodiments, the comparator circuit may find the K largest in a single set of operations, such as having a comparator circuit that is used to find a fixed number of largest values. In other embodiments, the comparator circuit may select a single largest value in the N values in a set of comparisons that finds the largest value, repeats the set of comparisons to select the next largest value, and continues to the repetition until K largest values are found. This unsorted comparison approach is particularly efficient at performing a local K-winner activation process, where K is usually a small number in a local K-winner approach.

Example Local K-Winner Process and Architecture

Figures 10A, 10B:
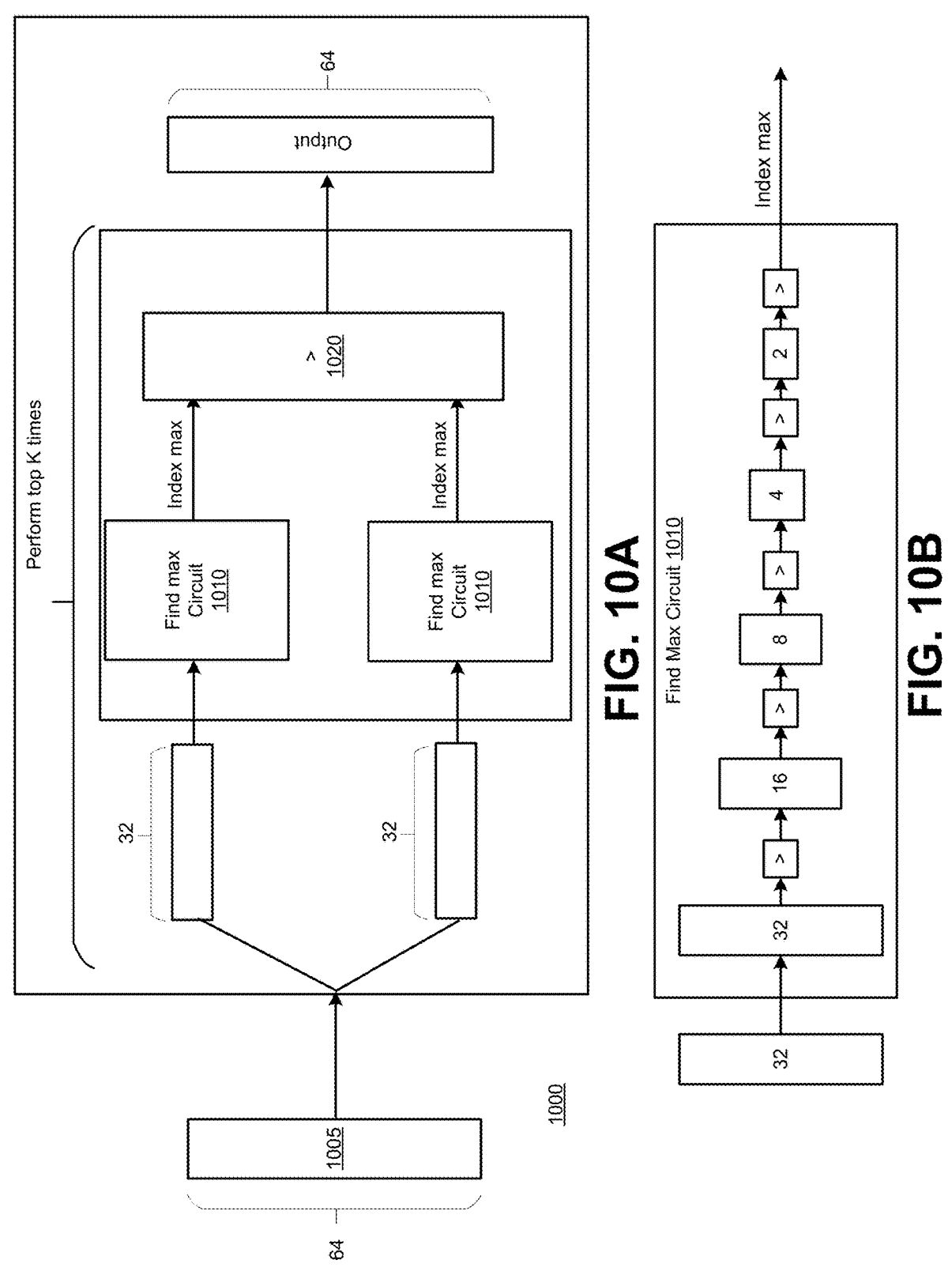
FIGS. 10A and 10B are block diagrams illustrating an example hardware architecture of a comparator circuit that is efficient at performing a K-winner approach, according to an embodiment.

FIGS. 10A and 10B are block diagrams illustrating an example hardware architecture of a comparator circuit 1000 that is efficient at performing a K-winner approach, according to an embodiment. The comparator circuit 1000 may be an example of the activation function circuit 370 or a part of the activation function circuit 370. The comparator circuit 1000 is efficient at performing the unsorted comparison approach whose comparisons are repeated K times until K largest values in a set of data are found. For illustration, the set of data includes 64 values (N=64), but another number of values may also be used.

The comparator circuit 1000 may store unsorted values in a buffer array 1005. The comparator circuit 1000 includes one or more find max circuits 1010 that are used to find the maximum value in a number of data. For the particular example shown in FIG. 10A, the comparator circuit 1000 includes two find max circuits 1010. Each find max circuit

1010 may take the form of a comparator tree circuit that selects the maximum value from a number of values. In the particular example shown in FIG. 10B, the find max circuit 1010 determines the highest value from an input of 32 values. Again, the actual number is only illustrated here as an example only. The comparator tree circuit includes 16 comparators in the first round. Each comparator compares two values and passes along the greater values so that 32 values are reduced to the 16 values. In the second round, the comparator tree circuit includes 8 comparators to reduce the number of values from 16 to 8. The comparator tree circuit continues to perform the comparison until the maximum value is determined. The index (e.g., the index in the buffer array 1005) of the maximum value is also output. Referring back to FIG. 10A, the comparator circuit 1000 includes two find max circuit 1010 so that the maximum value in each circuit 1010 is output. The two values are compared in another comparator 1020. The index of the maximum value (or the value itself) may also be sent as part of the output.

The comparator tree circuit selects the highest value from a number of values. The comparator circuit 1000 selects the number of active values K by repeatedly running the comparator tree circuit until the selected active values reach K. The value and index are output. Before the next round of comparison, the value of the already selected maximum value in the original array is overwritten with a minimum value (e.g. 0), so that such value is removed from contention for the next round. As such, K largest numbers are selected. The input of the comparator circuit 1000 may be parallel values while the output may be serial values.

The architecture of comparator circuit 1000 provides various advantages such as speed, pipelining, and flexibility. The values of K in different nodes in a neural circuit may be different. Hence, the repetition approach that repeats the operations in the comparator circuit 1000 K times is more flexible than a circuit architecture that is dedicated to finding fixed K-highest values. The architecture of comparator circuit 1000 also avoids memory allocation problems. The architecture of comparator circuit 1000 also does not need to increase the memory size and can be efficiently pipelined.

The specific hardware arrangement illustrated in FIGS. 10A and 10B, in which data processing are split into two find max circuits, is shown as an example only. For instance, in some embodiments, a single find max circuit that starts with 32 comparators may be used to process the data in a single pipeline. In other embodiments, instead of splitting data into two find max circuits, the data processing may be split into other multiple circuits, such as 4 find max circuits or further subdivisions. Also, in various embodiments, the number of values and the number of comparators do not need to be in the multiples of 2 or an even number.

Example Blocky K-Winners

Figure 11:
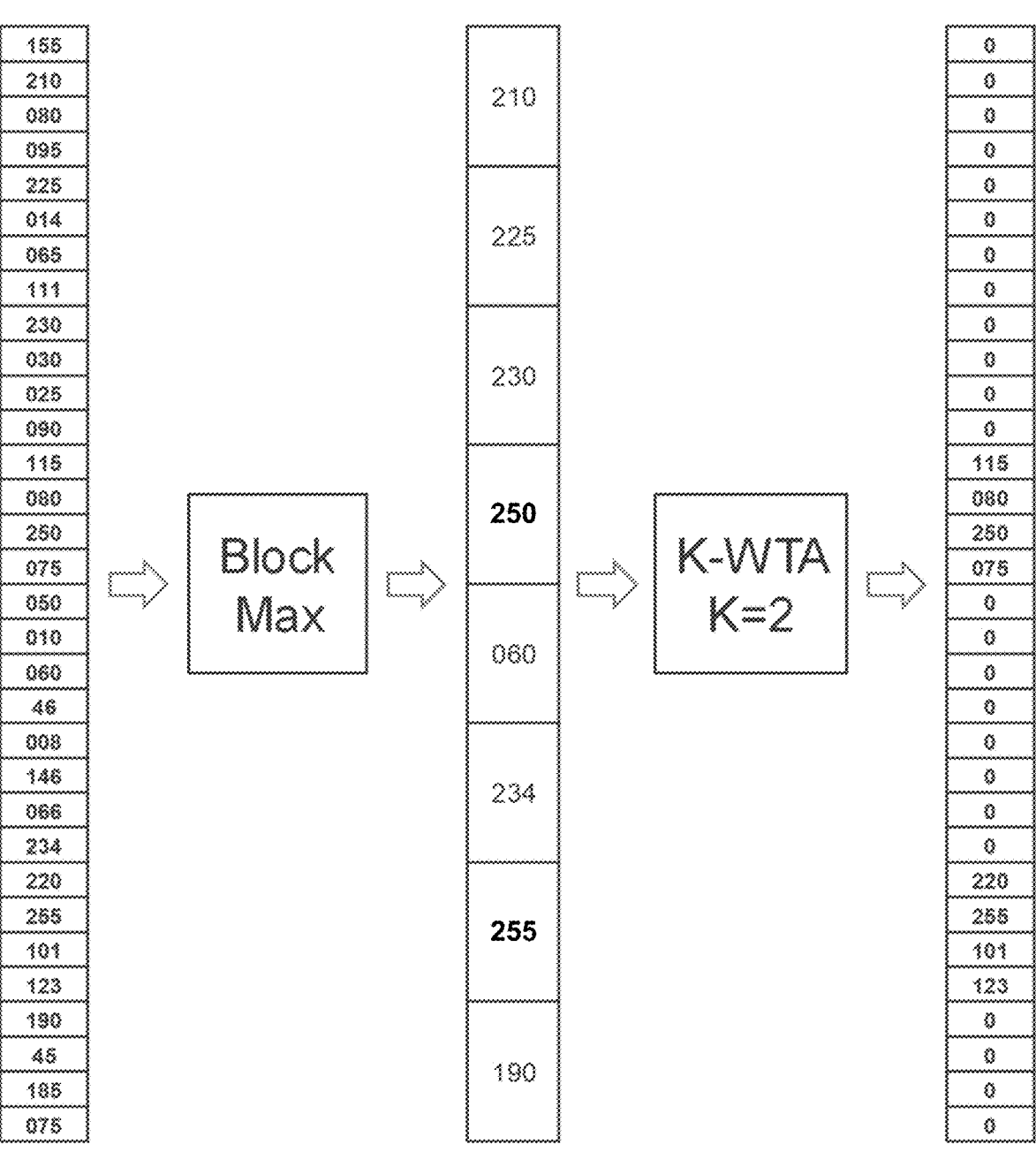
FIG. 11 is a conceptual diagram illustrating a blocky K-winner approach that may be implemented as by a hardware architecture, according to an embodiment.

FIG. 11 is a conceptual diagram illustrating a blocky K-winner approach that may be implemented as by a hardware architecture, according to an embodiment. A K-winner approach may impose one or more structural constraints on the distribution of the active values in the output activation tensor 228. For example, in one embodiment, the active values are distributed in a block structure in which the output activation tensor 228 is divided into a plurality of blocks. Each block includes a plurality of values. Each block is either active or inactive. In an active block, at least one of the values is active. In an inactive block, all of the values are inactive. In such a case, the K may correspond to the number of active blocks. A comparator circuit may select K active blocks (instead of K active values). This K-winner approach may be referred to as blocky K winners.

Each active block may be selected based on an aggregated value of the block instead of the individual values within the block. The aggregated value may be the maximum values in a block, the minimum values in a block, the sum of the values in a block, the average of the values in a block, or another suitable statistic of a block. After the active blocks are chosen, the rest of the values in the unchosen blocks are set to zeros. The values in the chosen active blocks are passed on.

FIG. 11 illustrates an example of the blocky K-winner approach. In this example, the set of data is divided into a plurality of blocks. Each block has four values. The aggregated value selected in this example is the maximum value within a block. Hence, for the first block, 210 is the aggregated value out of a block of values [155, 210, 80, 95]. After the aggregated values for those blocks are determined, the comparator circuit selects K largest aggregated values. In this example, K is set to 2. As a result, only the 4th block and the 7th block, which respectively has the aggregated value of 250 and 255, are selected. The values in the 4th block and the 7th block are passed as outputs. Hence, the values [115, 80, 250, and 75] and the values [220, 255, 101, 123] are passed. The rest of the values are set to zero.

In various embodiments, the comparator circuit may be implemented as one or more sets of comparator trees that have a structure similar to that illustrated in FIGS. 10A and 10B. The comparator circuit may include different computation circuits that are used to perform the aggregation of values. The aggregation circuit may include comparators for finding maximum or minimum and include adders for finding sum or average. For the comparisons of aggregated values, a comparator tree circuit that is similar to the one used in FIG. 10B may be used. In some embodiments, the comparator circuit may be a multi-mode circuit that allows an instruction to select what the aggregation process is.

In some cases, the number of non-zero values of a block is potentially variable if the block, despite active at the block level, still includes one or more inactive values. In this situation, the sparsity of the output may vary and is less amenable to being processed by fixed computational resources in the next layer of the neural network. To address this situation, a second-tier K-winners may be performed within each selected block to bound the number of non-zero elements within the block. Additional structure restraints, such as two-dimensional blocky selection and multi-tier blocky selection, are discussed in FIGS. 4A and 4B.
Example Global K-Winner Process and Architecture In some embodiments, the entire dataset for an output activation tensor 228 may include thousands of values or more. Even though the K value in a sparse activation is usually a relatively smaller number compared to the dataset size of the output activation tensor 228, K may still be a large number. For example, in one case, the output activation tensor 228 may include 1,500 values. The global K value may be set at 225, which may still be a large value compared to a local K-winner approach. As such, in some embodiments, a global K-winner approach may use a different selection process and hardware architecture than a local K-winner approach.

In one embodiment, a histogram approach may be used for selecting global K-winners. The histogram approach may include two passes of operations. In the first pass, the values in the output activation tensor 228 are stored in a buffer array. The values are used to build and update a histogram with a plurality of bins. After the histogram is completed, the histogram's bin counts are summed starting at the maximum non-empty bin. When the summation count reaches the desired K value, the bin location is used to set a threshold. In the second pass, each of the values in the output activation tensor 228 stored in the buffer array is compared to the threshold value in a comparator circuit. If a value is greater than or equal to the threshold, the value is kept and passed on as the output. If a value is smaller than the threshold, the value is discarded and the value location is set to zero. The indices of the values that are kept as active values may also be output.

Figure 12:
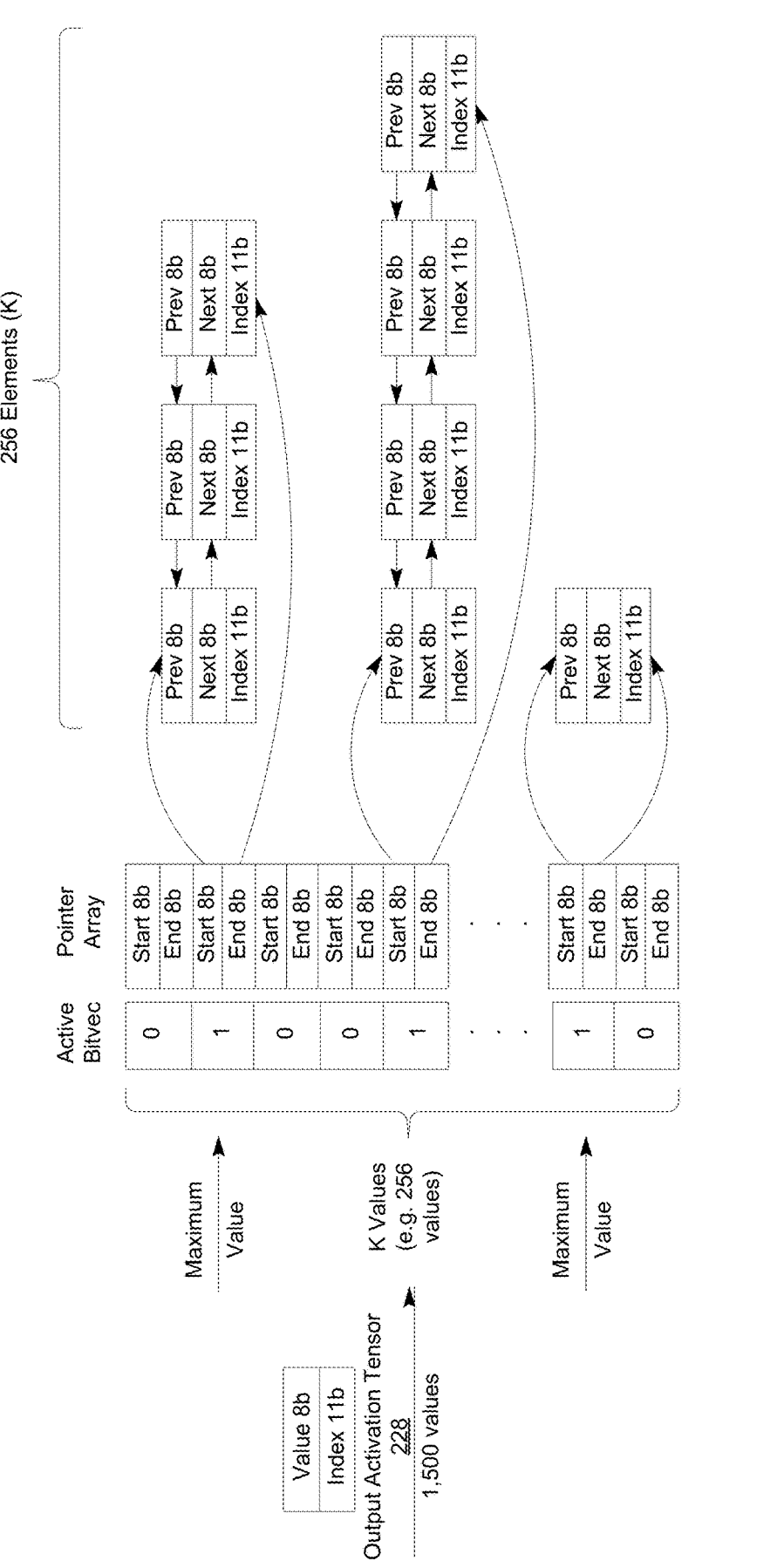
FIG. 12 is a conceptual diagram illustrating a bucket data structure, according to an embodiment.

In one embodiment, a bucket approach may be used for selecting global K-winners. The bucket approach is an example of the sorted data stream approach. FIG. 12 is a conceptual diagram illustrating the bucket data structure, according to an embodiment. The numbers used in FIG. 12 are for example only. The output activation tensor 228 may include a significantly larger number of values than the K value, which is set at 256 in this example. Each value may include an 8-bit data value and an index value that represents the memory address of the value. A stream of data values from the output activation tensor 228 are fetched to a pointer array until the pointer array reaches its capacity, which may correspond to the K value. For example, initial 256 non-zero entries are stored in the pointer array. The values are sorted in the pointer array. The sorted values may be the form of a linked list that connects the values from the maximum value in the pointer array to the minimum value in the pointer array. A new value is continuously fetched to the buffer array. If a new value is larger than the minimum value stored in the buffer array, the new value will replace the minimum value. The replacement takes place in the pointer array that changes the pointer address of the value that is immediately greater than the new value so that the new value is inserted. The second to last value's pointer is dropped so that the minimum value is dropped.

The bucket approach may provide a more streamlined process than a histogram approach, which may involve two stages. The bucket approach may be pipelined. Also, values may start to be outputted after the number of remaining values in the input data stream has fewer than K values. When the input data stream has fewer than K values, the number of values in the output activation tensor 228 that still need to compare is fewer than K. When the pointer array receives a new value, if the new value is larger than the maximum value, the new value will be immediately output because there are fewer than K unsorted values remaining. If the new value is smaller than the minimum value, the new value is discarded and the current maximum value in the pointer array is immediately output because there remain fewer than K unsorted values that can be larger than the current maximum value. As such, the output can be pipelined and can start to generate before the entire input is analyzed. This reduces the pipeline latency and does not need a threshold determination phase compared to the histogram approach.

Figure 13:
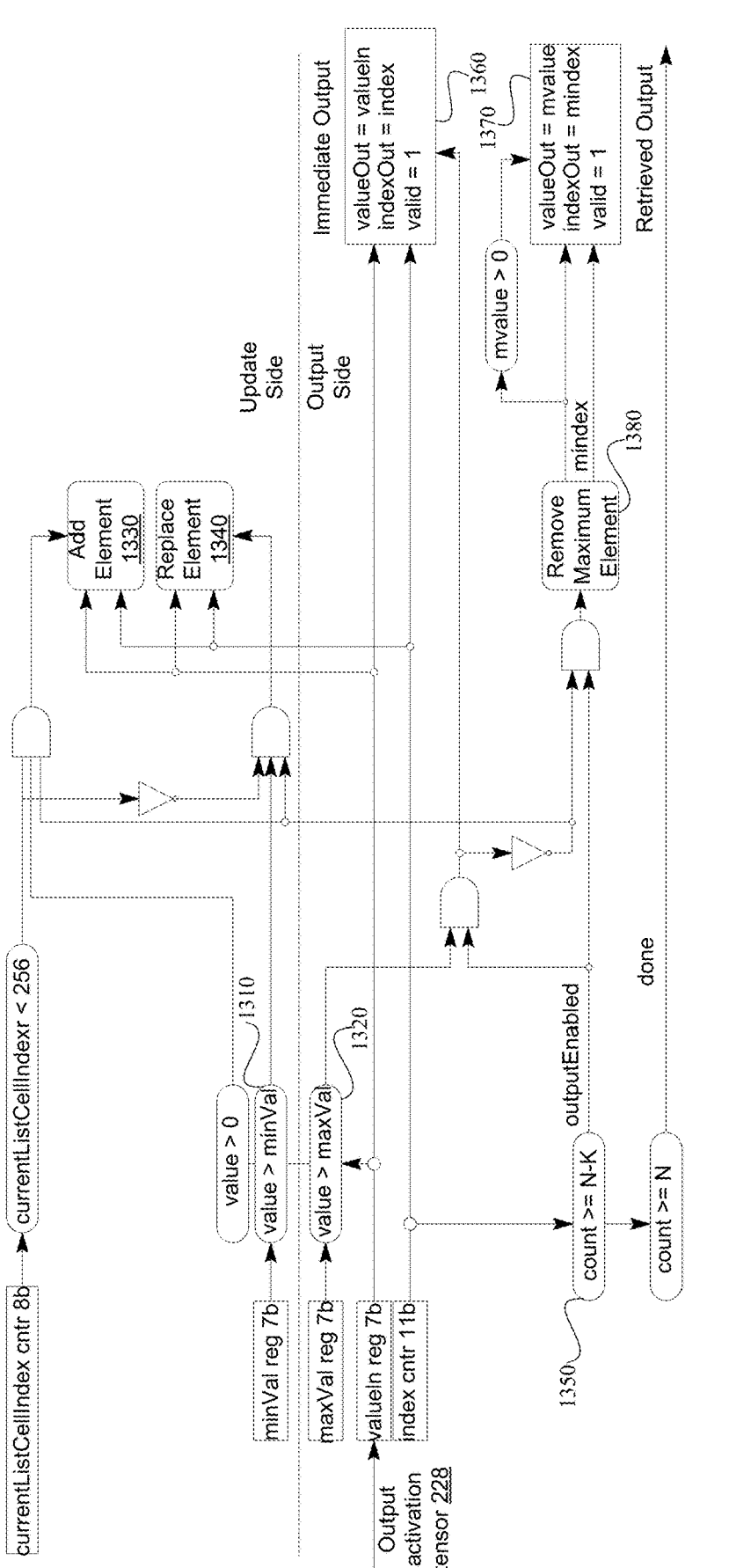
FIG. 13 is a block diagram illustrating an example circuitry of a comparator circuit to perform the bucket approach, according to an embodiment.

FIG. 13 is a block diagram illustrating an example circuitry of a comparator circuit 1300 to perform the bucket approach, according to an embodiment. The values from the input (e.g., a dense output activation tensor 228) and the corresponding indices are continuously fetched to the comparator circuit. A new value is compared to the maximum value and the minimum value in the linked list at the comparators 1310 and 1320. If the new value is larger than the minimum value, the new value is included in the linked list. The new value is added to the linked list at block 1330 and the original minimum value is removed at the replace element block 1340. The comparator circuit 1300 may also include a counter 1350 that counts the number of values processed. If the counter is larger than N–K, where N is the total number of values in the input, sending output is enabled (binary signal outputEnabled). In such a case, in comparator 1320, if a new value is determined to be larger than the maximum value of the linked list, the new value is immediately output, as shown in block 1360. When the output is enabled and, in comparator 1310, if the new value is determined to be smaller than the minimum value in the linked list, the maximum value is immediately output in block 1370 and is removed from the linked list in block 1380. If the counter reaches N, a signal is sent to retrieve the entire output.

While the bucket approach is discussed in the context of a global K-winner approach, the bucket approach may also be efficient at selecting local K winners.

In one embodiment, the comparator circuit may need to implement a tie-breaker feature in the histogram approach or the bucket approach. If there are multiple values identical to the threshold, either greater than K values will be output or a tie-breaker algorithm is used to output a subset of the threshold values. In various embodiments, different tie-breaking schemes may be used. In one scheme, the threshold values with the smallest indices are selected first. This scheme is stable and repeatable. In another scheme, the threshold values are randomly chosen. This scheme may be referred to as a fair tie-breaker. Empirically this scheme may produce better inference accuracy. Both tie-breaking schemes can be readily implemented in the K-winners bucket approach. In one embodiment, later arriving values are added to the end of the bucket chain so that the first tie-breaker scheme is implemented. In another embodiment, the later arriving values are randomly placed either at the beginning or end of the bucket chain, the second tie-breaker is implemented.

Upon reading this disclosure, those of skill in the art will appreciate still additional alternative designs for processing nodes. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An artificial intelligence accelerator for performing operations related to a neural network, comprising:
    a memory circuit configured to store a weight tensor and an input activation tensor of a first node of the neural network;
    a multiply circuit coupled to the memory circuit, the multiply circuit configured to perform a convolution operation between the weight tensor and the input activation tensor of the first node to generate a version of an output activation tensor; and
    a comparator tree circuit coupled to the multiply circuit, the comparator tree circuit comprising a hierarchical arrangement of comparator circuits, and configured to:
        receive the output activation tensor,
        compare between at least two of active values in the output activation tensor, and
        set one or more of the active values in the output activation tensor to zero according to the comparison to generate a version of a sparsified output activation tensor with a reduced number of active values relative to the output activation tensor, the sparsified output activation tensor used as an input activation tensor of a second node of the neural network.

2. The artificial intelligence accelerator of claim 1, wherein the comparator tree circuit is configured to reduce the number of active values in the output activation tensor globally by selecting a limited number of the active values throughout the output activation tensor based on the comparison.

3. The artificial intelligence accelerator of claim 1, wherein the comparator tree circuit is configured to reduce the number of the active values in the output activation tensor locally by:
    dividing the output activation tensor into a plurality of subsets;
    selecting, for each subset, a limited number of active values in the subset based on the comparison.

4. The artificial intelligence accelerator of claim 3, wherein the output activation tensor is divided based on the weight tensor of the first node of the neural network, wherein each subset corresponds to a result of the convolution operation with the weight tensor.

5. The artificial intelligence accelerator of claim 1, wherein the number of active values in the sparsified output activation tensor of the first node is different from the number of active values in a sparsified output activation tensor of the second node of the neural network.

6. The artificial intelligence accelerator of claim 1, wherein the comparator tree circuit is configured to reduce the number of the active values by:
    receiving a stream of values in the output activation tensor;
    sorting the stream of values to a sorted number of values; and
    discarding values that are not selected in the sorted number of values.

7. The artificial intelligence accelerator of claim 6, wherein the sorted number of values are stored as a linked list in a pointer array.

8. The artificial intelligence accelerator of claim 1, wherein the comparator tree circuit is configured to reduce the number of the active values by:
    storing values in the output activation tensor in a buffer array;
    selecting the number of the active values in the output activation tensor; and
    setting remaining of the values in the output activation tensor other than the selected active values to zero.

9. The artificial intelligence accelerator of claim 1, wherein the comparator tree circuit is configured to reduce the number of active values in the output activation tensor by restricting the output activation tensor to have a structure that defines a distribution of the active values.

10. The artificial intelligence accelerator of claim 1, wherein the active values are distributed in a block structure in which the output activation tensor is divided into a plurality of blocks, each block comprising a plurality of values, each block being either active or inactive, wherein in an active block, at least one of the values is active, and in an inactive block, all of the values are inactive.

11. The artificial intelligence accelerator of claim 10, wherein the comparator tree circuit is configured to reduce the number of the active values in the output activation tensor by selecting a number of active blocks, and wherein each selected active block is selected based on an aggregated value of the selected active block.

12. The artificial intelligence accelerator of claim 1, wherein the comparator tree circuit is configured to apply one or more tie-breaker criteria to determine which one of the active values in the output activation tensor is to be selected.

13. A computer-implemented method for processing a neural network, the computer-implemented method comprising:

storing, by a memory circuit, a weight tensor and an input activation tensor of a first node of the neural network;

performing, by a multiply circuit, a convolution operation between the weight tensor and the input activation tensor of the first node to generate a version of an output activation tensor;

receiving, by a comparator tree circuit including a hierarchical arrangement of comparator circuits, the output activation tensor;

comparing, by the comparator tree circuit, between at least two of active values in the output activation tensor;

setting, by the comparator tree circuit, one or more of the active values in the output activation tensor to zero according to the comparison to generate a version of a sparsified output activation tensor with a reduced number of active values relative to the output activation tensor; and using the sparsified output activation tensor as an input activation tensor of a second node of the neural network.

14. The computer-implemented method of claim 13, wherein reducing the number of active values in the output activation tensor is performed globally by selecting a limited number of the active values throughout the output activation tensor based on the comparison.

15. The computer-implemented method of claim 13, wherein reducing the number of active values in the output activation tensor comprises:

storing values in the output activation tensor in a buffer array;

selecting the number of active values in the output activation tensor; and setting remaining of the values in the output activation tensor other than the selected active values to zero.

16. A computing device, comprising:

a memory configured to store a neural network that comprises a plurality of nodes, at least one node associated with a weight tensor and an input activation tensor; and an artificial intelligence accelerator coupled to the memory, the artificial intelligence accelerator configured to:

store the weight tensor and the input activation tensor that corresponds to a first node of the neural network;

perform a convolution operation between the weight tensor and the input activation tensor of the first node to generate a version of an output activation tensor;

compare between at least two of active values in the output activation tensor to set one or more active values in the output activation tensor to zero using a comparator tree circuit that includes a hierarchical arrangement of comparator circuits; and generate a version of a sparsified output activation tensor with a reduced number of the active values relative to the output activation tensor by setting the one or more active values in the output activation tensor to zero according to the comparison, the sparsified output activation tensor used as an input activation tensor of a second node of the neural network.

17. The computing device of claim 16, wherein artificial intelligence accelerator is configured to reduce the number of the active values in the output activation tensor by:

storing values in the output activation tensor in a buffer array;

selecting the number of the active values; and setting remaining of the values in the output activation tensor that are not selected to zero.

18. The computing device of claim 16, wherein reducing the number of active values in the output activation tensor is performed globally by selecting a limited number of active values throughout the output activation tensor.

19. The artificial intelligence accelerator of claim 1, wherein the comparator tree circuit is configured to retain a predetermined number of the active values by setting the one or more of the active values in the output activation tensor to zero.

20. The artificial intelligence accelerator of claim 1, wherein the comparator tree circuit comprises find max circuits that selects a highest active value from at least a subset of the active values in the output activation tensor.

* * * * *